US011405619B2

(12) United States Patent
Reuze et al.

(10) Patent No.: US 11,405,619 B2
(45) Date of Patent: Aug. 2, 2022

(54) GEOMETRIC PARTITION MODE WITH SIMPLIFIED MOTION FIELD STORAGE AND MOTION COMPENSATION IN VIDEO CODING

(71) Applicant: QUALCOMM Incorporated, San Diego, CA (US)

(72) Inventors: Kevin Pascal Andre Reuze, Thorigne-Fouillard (FR); Chun-Chi Chen, San Diego, CA (US); Han Huang, San Diego, CA (US); Wei-Jung Chien, San Diego, CA (US); Vadim Seregin, San Diego, CA (US); Marta Karczewicz, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 126 days.

(21) Appl. No.: 17/028,517

(22) Filed: Sep. 22, 2020

(65) Prior Publication Data

US 2021/0092392 A1 Mar. 25, 2021

Related U.S. Application Data

(60) Provisional application No. 62/905,276, filed on Sep. 24, 2019, provisional application No. 62/904,566, filed on Sep. 23, 2019.

(51) Int. Cl.
*H04N 19/132* (2014.01)
*H04N 19/105* (2014.01)
(Continued)

(52) U.S. Cl.
CPC ............. *H04N 19/132* (2014.11); *G06F 1/03* (2013.01); *H04N 19/105* (2014.11); *H04N 19/119* (2014.11); *H04N 19/176* (2014.11)

(58) Field of Classification Search
CPC .... G06F 1/03; G06K 7/10722; G06K 7/1413; G06K 7/1417; G07G 1/0054; G07F 7/06;
(Continued)

(56) References Cited

U.S. PATENT DOCUMENTS

| 11,159,793 | B2* | 10/2021 | Ahn ..................... H04N 19/119 |
| 2011/0200097 | A1* | 8/2011 | Chen .................... H04N 19/119 |
| | | | 375/E7.243 |

(Continued)

OTHER PUBLICATIONS

International Search Report and Written Opinion—PCT/US2020/052234—ISA/EPO—dated Jan. 12, 2021 18 Pages.
(Continued)

*Primary Examiner* — Joon Kwon
(74) *Attorney, Agent, or Firm* — Shumaker & Sieffert, P.A.

(57) ABSTRACT

A video decoder can be configured to determine, for a block of video data encoded in a geometric partition mode, an angle for the block for the geometric partition mode; determine a separation line displacement relative to a center of the block for the geometric partition mode; partition the block into first and second partitions based on the angle and the separation line displacement; determine first predictive samples for the block using a motion vector for the first partition and second predictive samples for the block using a motion vector for the second partition; determine a power-of-2 number based on the angle for the block; determine weighting values based on the power-of-2 number; perform a blending operation on the first predictive samples and the second predictive samples based on the weighting values to determine a prediction block for the block.

46 Claims, 19 Drawing Sheets

(51) Int. Cl.
  *H04N 19/119* (2014.01)
  *H04N 19/176* (2014.01)
  *G06F 1/03* (2006.01)
(58) Field of Classification Search
  CPC .... G06Q 20/18; H04N 19/105; H04N 19/119;
      H04N 19/132; H04N 19/147; H04N
      19/176; H04N 19/503; H04N 19/70
  See application file for complete search history.

(56) References Cited

U.S. PATENT DOCUMENTS

| | | | | |
|---|---|---|---|---|
| 2011/0200109 | A1* | 8/2011 | Joshi | H04N 19/513 |
| | | | | 375/E7.115 |
| 2011/0200111 | A1* | 8/2011 | Chen | H04N 19/537 |
| | | | | 375/240.16 |
| 2021/0168409 | A1* | 6/2021 | Furht | H04N 19/119 |

OTHER PUBLICATIONS

Reuze (Qualcomm) K., et al., "CE4-Related: Combination of JVET-P0264 and JVET-P0304 on GEO Simplification", 16. JVET Meeting, Oct. 1, 2019-Oct. 11, 2019, Geneva, (The Joint Video Exploration Team of ISO/IEC JTC1/SC29/WG11 and ITU-T SG.16), No. JVET-P0746, Oct. 1, 2019 (Oct. 1, 2019), XP030218072, 10 Pages, Retrieved from the Internet:URL:http://phenix.int-evry.fr/jvet/doc_end_user/documents/16_Geneva/wg11/JVET-P0746-v1.zip JVET-P0746.docx [retrieved on Oct. 1, 2019].
Bossen F., et al., "JVET Common Test Conditions and Software Reference Configurations for SDR Video", Joint Video Experts Team (JVET) of ITU-T SG 16 WP 3 and ISO/IEC14 UTC 1/5C 29/WG 11, 14th Meeting: Geneva, CH, Mar. 19-27, 2019, JVET-N1010-v1, pp. 1-6.
Bross B., et al., "High Efficiency Video Coding (HEVC) Text Specification Draft 10 (for FDIS & Last Call)", 12th Meeting, Geneva, CH, Jan. 14-23, 2013, (Joint Collaborative Team on Video Coding of ISO/IEC JTC 1/SC 29/WG 11 and ITU-T SG 16 WP 3), JCTVC-L1003_v34, Mar. 19, 2013, 310 pages.
Bross B., et al., "Versatile Video Coding (Draft 10)", JVET-S2001-vA, Joint Video Experts Team (JVET) of ITU-T SG 16 WP 3 and ISO/IEC JTC 1/SC 29/WG 11, 19th Meeting: by Teleconference, Jun. 22-Jul. 1, 2020, 550 Pages.
Bross B., et al., "Versatile Video Coding (Draft 6)", 127. MPEG and 15th JVET Meeting, Jul. 3, 2019-Jul. 12, 2019, Gothenburg, (Motion Picture Expert Group or JVET of ISO/IEC JTC1/SC29/WG11 and ITU-T SG 16 WP 3), No. m49908, JVET-O2001-vE, Jul. 15, 2019 (Jul. 15, 2019), XP030208562, 455 Pages, Retrieved from the Internet: URL: http://phenix.int-evry.fr/mpeg/doc_end_user/documents/127_Gothenburg/wg11/m49908-JVET-O2001-v8-JVET-O2001-v8.zip JVET-O2001-v8.docx [retrieved on Jul. 15, 2019].
Chen C-C., et al., "CE4: Summary Report on Inter Prediction", JVET-P0024-v1, Joint Video Experts Team (JVET) of ITU-T SG 16 WP 3 and ISO/IEC JTC 1/SC 29/WG 11, 16th Meeting, Geneva, CH, Oct. 1-11, 2019, pp. 1-8.

Chen C-C., et al., "Description of Core Experiment 4 (CE4): Inter Prediction with Geometric Partitioning", JVET-P2024-v1, Joint Video Experts Team (JVET) of ITU-T SG 16 WP 3 and ISO/IEC JTC 1/SC 29/WG 11, 16th Meeting, Geneva, CH, Oct. 1-11, 2019, pp. 1-4.
Chen J., et al., "Algorithm Description for Versatile Video Coding and Test Model 5 (VTM 5)", 14th JVET Meeting, Mar. 19, 2019-Mar. 27, 2019, Geneva, (The Joint Video Exploration Team of ISO/IEC JTC1/SC29/WG11 and ITU-T SG.16), No. JVET-N1002-v1, May 21, 2019, XP030205194, 70 Pages, Retrieved from the Internet: URL:http://phenix.int-evry.fr/jvet/doc_end_user/documents/14_Geneva/wg11/JVET-N1002-v1.zip JVET-N1002-v1.docx.
Chen J., et al., "Algorithm Description of Joint Exploration Test Model 1", 1. JVET Meeting, Oct. 19-21, 2015, Geneva (The Joint Video Exploration Team of ISO/IEC JTC1/SC29/WG11 and ITU-T SG.16 WP 3), URL: http://phenix.int-evry.fr/jvet/, No. JVET-A1001, Feb. 24, 2016 (Feb. 24, 2016), XP030150000, 27 Pages.
Esenlik S., et al., "Non-CE4: Geometrical partitioning for inter blocks", Joint Video Experts Team (JVET) of ITU-T SG 16 WP 3 and ISO/IEC JTC 1/SC 29/WG 11, 15th Meeting: Gothenburg, SE, Jul. 3-12, 2019, JVET-O0489-V4, pp. 1-9.
Gao H., et al., "CE4: CE4-1.1, CE4-1.2 and CE4-1.14: Geometric Merge Mode (GEO)", 16th Meeting: Geneva, CH, Oct. 1-11, 2019, (The Joint Video Exploration Team of ISO/IEC JTC1/SC29/WG11 and ITU-T SG.16), No. JVET-P0068-V1, pp. 1-6.
Gao H., et al., "CE4-1: Geometric Inter Prediction with 64 Modes", JVET-Q0059-v1, Joint Video Experts Team (JVET) of ITU-T SG 16 WP 3 and ISO/IEC JTC 1/SC 29/WG 11, 17th Meeting, Brussels, BE, Jan. 7-17, 2020, pp. 1-5.
Gao H., et al., "CE4-Related: Geometric Merge Mode (GEO) Simplifications", JVET-P0107-v1, Joint Video Experts Team (JVET) of ITU-T SG 16 WP 3 and ISO/IEC JTC 1/SC 29/WG 11, 16th Meeting, Geneva, CH, Oct. 1-11, 2019, pp. 1-8.
ITU-T H.265, Series H: Audiovisual and Multimedia Systems, Infrastructure of Audiovisual Services—Coding of Moving Video, High Efficiency Video Coding, The International Telecommunication Union, Jun. 2019, 696 Pages.
Kranzler M., et al., "Decoding Energy Assessment of VTM-6.0", JVET-P0084, Joint Video Experts Team (JVET) of ITU-T SG 16 WP 3 and ISO/IEC JTC 1/SC 29/WG 11, 16th Meeting, Geneva, CH, Oct. 1-11, 2019, pp. 1-9.
Liao R-L., et al., "CE4-related: Simplification of Blending Weights and Motion Field Storage in Geometric Merge Mode", JVET-P0304-v1, Joint Video Experts Team (JVET) of ITU-T SG 16 WP 3 and ISO/IEC JTC 1/SC 29/WG 11, 16th Meeting, Geneva, CH, Oct. 1-11, 2019, pp. 1-7.
Reuze K., et al., "CE4-related: Simplification of GEO Using Angles with Power-of Two Tangents", JVET-P0264-v4, Joint Video Experts Team (JVET) of ITU-T SG 16 WP 3 and ISO/IEC JTC 1/SC 29/WG 11, 16th Meeting, Geneva, CH, Oct. 1-11, 2019, pp. 1-6.
Reuze K., et al., "Simplified GEO without Multiplication and Minimum Blending Mask Storage (Harmonization of JVET-P0107, JVET-P0264 and JVET-P0304)", JVET-P0885-v4, Joint Video Experts Team (JVET) of ITU-T SG 16 WP 3 and ISO/IEC JTC 1/SC 29/WG 11, 16th Meeting: Geneva, CH, Oct. 1-11, 2019, pp. 1-7.

* cited by examiner

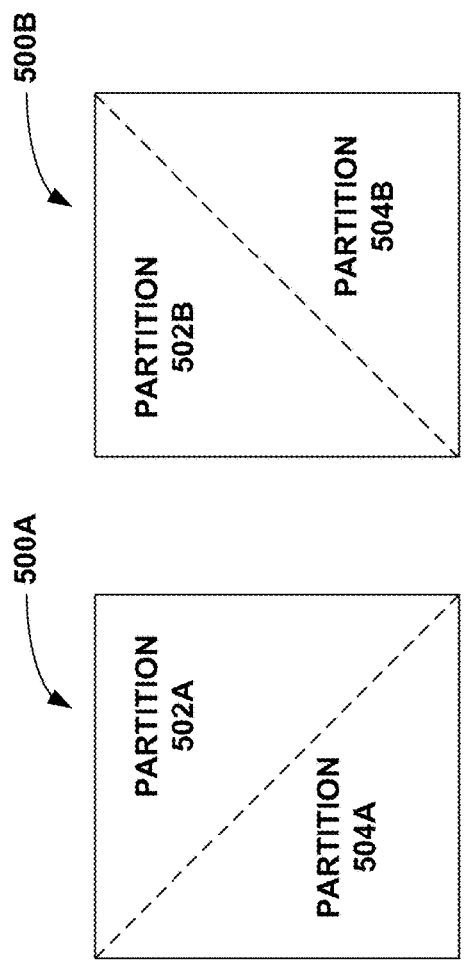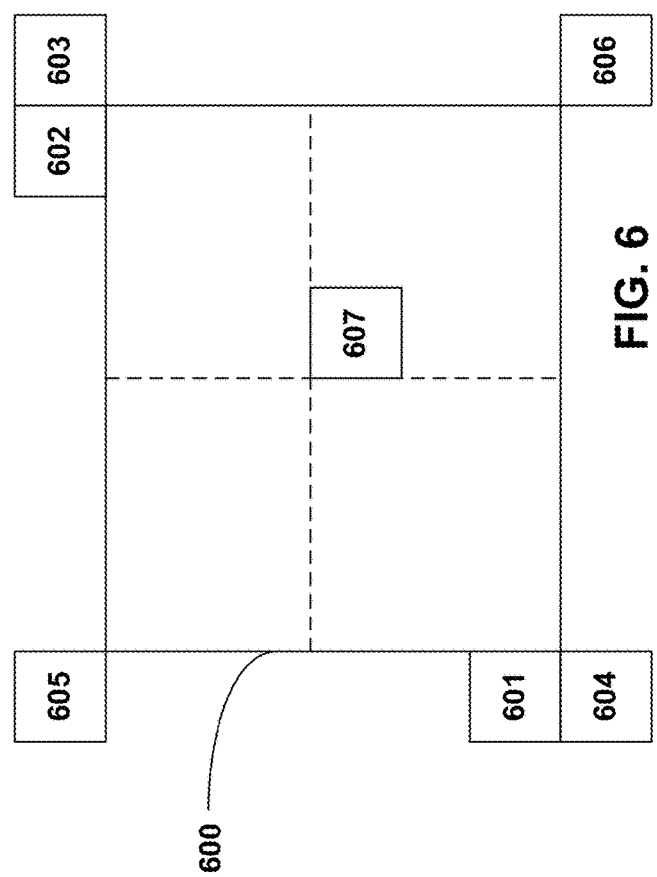

|  | | L0 MV | L1 MV |
|---|---|---|---|
| MERGE INDEX | 0 | X | |
| | 1 | | X |
| | 2 | X | |
| | 3 | | X |
| | 4 | X | |

FIG. 7

| 0 | 0 | 0 | 0 | 0 | 0 | 2 | 4 |
|---|---|---|---|---|---|---|---|
| 0 | 0 | 0 | 0 | 0 | 1 | 3 | 5 |
| 0 | 0 | 0 | 0 | 0 | 2 | 4 | 6 |
| 0 | 0 | 0 | 0 | 1 | 3 | 5 | 7 |
| 0 | 0 | 0 | 0 | 2 | 4 | 6 | 8 |
| 0 | 0 | 0 | 1 | 3 | 5 | 7 | ∞ |
| 0 | 0 | 0 | 2 | 4 | 6 | 8 | ∞ |
| 0 | 0 | 1 | 3 | 5 | 7 | ∞ | ∞ |
| 0 | 0 | 2 | 4 | 6 | 8 | ∞ | ∞ |
| 0 | 1 | 3 | 5 | 7 | ∞ | ∞ | ∞ |
| 0 | 2 | 4 | 6 | 8 | ∞ | ∞ | ∞ |
| 1 | 3 | 5 | 7 | ∞ | ∞ | ∞ | ∞ |
| 2 | 4 | 6 | 8 | ∞ | ∞ | ∞ | ∞ |
| 3 | 5 | 7 | ∞ | ∞ | ∞ | ∞ | ∞ |
| 4 | 6 | 8 | ∞ | ∞ | ∞ | ∞ | ∞ |
| 5 | 7 | ∞ | ∞ | ∞ | ∞ | ∞ | ∞ |
| 6 | 8 | ∞ | ∞ | ∞ | ∞ | ∞ | ∞ |
| 7 | ∞ | ∞ | ∞ | ∞ | ∞ | ∞ | ∞ |
| 8 | ∞ | ∞ | ∞ | ∞ | ∞ | ∞ | ∞ |
| ∞ | ∞ | ∞ | ∞ | ∞ | ∞ | ∞ | ∞ |
| ∞ | ∞ | ∞ | ∞ | ∞ | ∞ | ∞ | ∞ |
| ∞ | ∞ | ∞ | ∞ | ∞ | ∞ | ∞ | ∞ |
| ∞ | ∞ | ∞ | ∞ | ∞ | ∞ | ∞ | ∞ |
| ∞ | ∞ | ∞ | ∞ | ∞ | ∞ | ∞ | ∞ |
| ∞ | ∞ | ∞ | ∞ | ∞ | ∞ | ∞ | ∞ |
| ∞ | ∞ | ∞ | ∞ | ∞ | ∞ | ∞ | ∞ |
| ∞ | ∞ | ∞ | ∞ | ∞ | ∞ | ∞ | ∞ |
| ∞ | ∞ | ∞ | ∞ | ∞ | ∞ | ∞ | ∞ |
| ∞ | ∞ | ∞ | ∞ | ∞ | ∞ | ∞ | ∞ |
| ∞ | ∞ | ∞ | ∞ | ∞ | ∞ | ∞ | ∞ |

FIG. 15

| Angle (°) | Ratio W:H |
|---|---|
| 0° | 0:1 |
| ~~7.13°~~ | ~~1:8~~ |
| 14.04° | 1:4 |
| 26.57° | 1:2 |
| 45° | 1:1 |
| 63.43° | 2:1 |
| ~~75.96°~~ | ~~4:1~~ |
| ~~82.87°~~ | ~~8:1~~ |
| 90° | 1:0 |
| ~~97.13°~~ | ~~8:1~~ |
| ~~104.04°~~ | ~~4:1~~ |
| 116.57° | 2:1 |
| 135° | 1:1 |
| 153.43° | 1:2 |
| 165.96° | 1:4 |
| ~~172.87°~~ | ~~1:8~~ |

FIG. 16

GEOMETRIC PARTITION MODE WITH SIMPLIFIED MOTION FIELD STORAGE AND MOTION COMPENSATION IN VIDEO CODING

This application claims the benefit of:

U.S. Provisional Patent Application 62/904,566, filed 23 Sep. 2019; and

U.S. Provisional Patent Application 62/905,276, filed 24 Sep. 2019, the entire content of each being incorporated herein by reference.

TECHNICAL FIELD

This disclosure relates to video encoding and video decoding.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video coding techniques, such as those described in the standards defined by MPEG-2, MPEG-4, ITU-T H.263, ITU-T H.264/MPEG-4, Part 10, Advanced Video Coding (AVC), ITU-T H.265/High Efficiency Video Coding (HEVC), and extensions of such standards. The video devices may transmit, receive, encode, decode, and/or store digital video information more efficiently by implementing such video coding techniques.

Video coding techniques include spatial (intra-picture) prediction and/or temporal (inter-picture) prediction to reduce or remove redundancy inherent in video sequences. For block-based video coding, a video slice (e.g., a video picture or a portion of a video picture) may be partitioned into video blocks, which may also be referred to as coding tree units (CTUs), coding units (CUs) and/or coding nodes. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Pictures may be referred to as frames, and reference pictures may be referred to as reference frames.

SUMMARY

In general, this disclosure describes techniques for reducing complexity of inter-prediction such as by simplifying the storage for geometric partition mode (GEO) coding. In this way, the example techniques may provide a technical solution to a technical problem with practical applications to improve the operation of a video coder (e.g., video encoder or video decoder).

In one example of the disclosure, a method includes determining that a block of video data is encoded in a geometric partition mode; determining an angle for the block of the video data for the geometric partition mode; determining a separation line displacement relative to a center of the block for the geometric partition mode; partitioning the block into a first partition and a second partition based on the angle and the separation line displacement; determining first predictive samples for the block of the video data using a motion vector for the first partition; determining second predictive samples for the block of the video data using a motion vector for the second partition; determining a power-of-2 number based on the angle for the block of the video data; determining weighting values based on the power-of-2 number; performing a blending operation on the first predictive samples and the second predictive samples based on the weighting values to determine a prediction block for the block of the video data; and outputting the prediction block.

In another example of the disclosure, a device for decoding video data includes a memory configured to store video data and one or more processors implemented in circuitry and configured to determine that a block of the video data is encoded in a geometric partition mode; determine an angle for the block of the video data for the geometric partition mode; determine a separation line displacement relative to a center of the block for the geometric partition mode; partition the block into a first partition and a second partition based on the angle and the separation line displacement; determine first predictive samples for the block of the video data using a motion vector for the first partition; determine second predictive samples for the block of the video data using a motion vector for the second partition; determine a power-of-2 number based on the angle for the block of the video data; determine weighting values based on the power-of-2 number; perform a blending operation on the first predictive samples and the second predictive samples based on the weighting values to determine a prediction block for the block of the video data; and output the prediction block.

In another example of the disclosure, an apparatus for decoding video data includes means for determining that a block of the video data is encoded in a geometric partition mode; means for determining an angle for the block of the video data for the geometric partition mode; means for determining a separation line displacement relative to a center of the block for the geometric partition mode; means for partitioning the block into a first partition and a second partition based on the angle and the separation line displacement; means for determining first predictive samples for the block of the video data using a motion vector for the first partition; means for determining second predictive samples for the block of the video data using a motion vector for the second partition; means for determining a power-of-2 number based on the angle for the block of the video data; means for determining weighting values based on the power-of-2 number; means for performing a blending operation on the first predictive samples and the second predictive samples based on the weighting values to determine a prediction block for the block of the video data; and means for outputting the prediction block.

In another example of the disclosure, a computer-readable storage medium storing instructions that when executed by one or more processors cause the one or more processor to determine that a block of video data is encoded in a geometric partition mode; determine an angle for the block of the video data for the geometric partition mode; determine a separation line displacement relative to a center of the block for the geometric partition mode; partition the block into a first partition and a second partition based on the angle and the separation line displacement; determine first predictive samples for the block of the video data using a motion vector for the first partition; determine second predictive samples for the block of the video data using a motion vector for the second partition; determine a power-of-2 number based on the angle for the block of the video data; determine weighting values based on the power-of-2 number; perform a blending operation on the first predictive samples and the second predictive samples based on the weighting values to determine a prediction block for the block of the video data; and output the prediction block.

The details of one or more examples are set forth in the accompanying drawings and the description below. Other features, objects, and advantages will be apparent from the description, drawings, and claims.

BRIEF DESCRIPTION OF DRAWINGS

FIGS. 5A and 5B are conceptual diagrams illustrating examples of diagonal split and anti-diagonal split triangle partition based on inter-prediction, respectively.

FIG. 6 is a conceptual diagram illustrating an example of spatial and temporal neighboring blocks used to construct a candidate list.

FIG. 7 is a table illustrating motion vector prediction selection for triangle partition mode.

FIG. 15 is a table illustrating example of weights for GEO using the angle with ratio 2:1.

FIG. 16 is a table illustrating angles to remove for reduced number of partitions.

DETAILED DESCRIPTION

Figure 1:
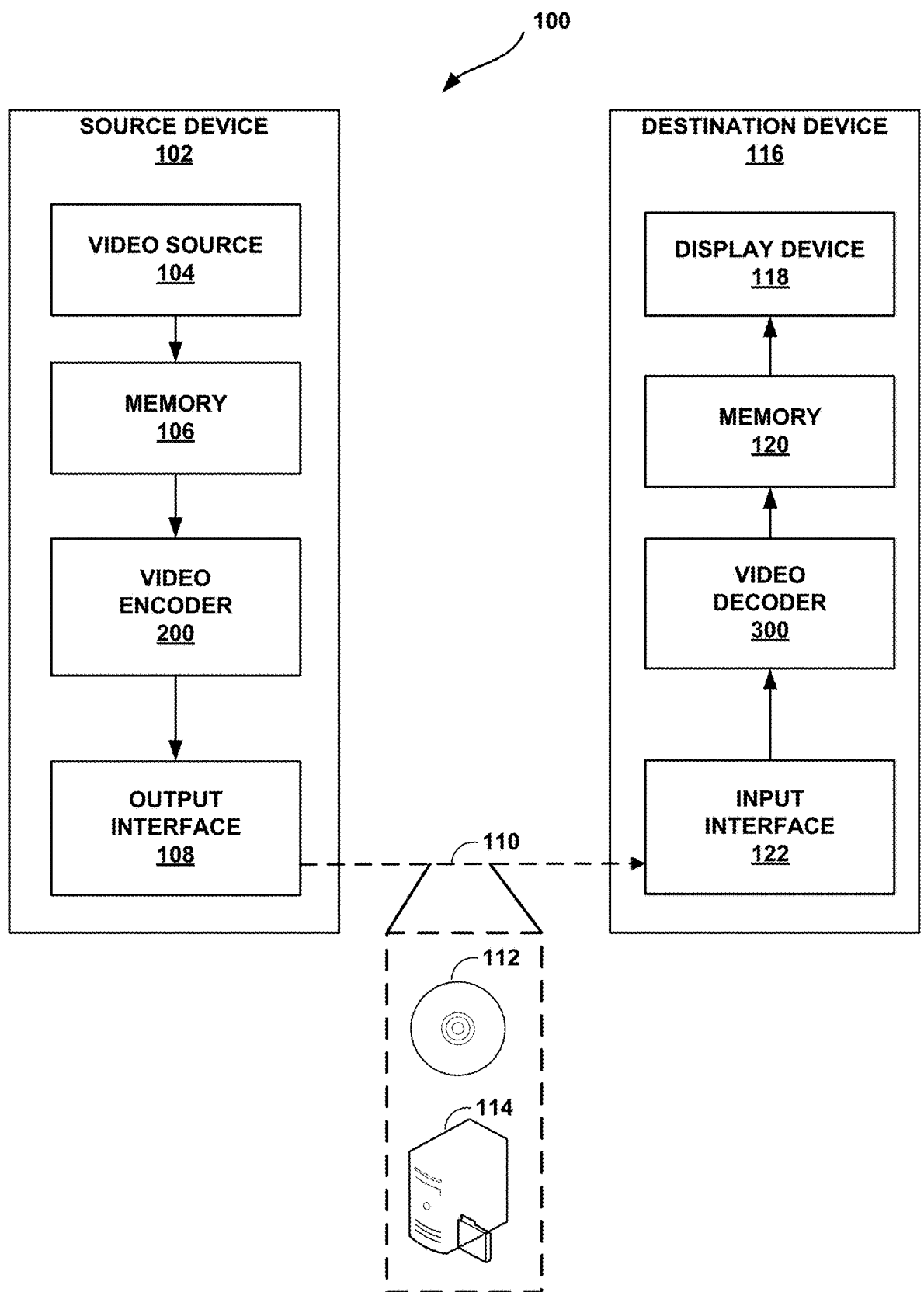
FIG. 1 is a block diagram illustrating an example video encoding and decoding system that may perform the techniques of this disclosure.

Video coding (e.g., video encoding and/or video decoding) typically involves predicting a block of video data from either an already coded block of video data in the same picture (e.g., intra prediction) or an already coded block of video data in a different picture (e.g., inter prediction). In some instances, the video encoder also calculates residual data by comparing the prediction block to the original block. Thus, the residual data represents a difference between the prediction block and the original block. To reduce the number of bits needed to signal the residual data, the video encoder transforms and quantizes the residual data and signals the transformed and quantized residual data in the encoded bitstream. The compression achieved by the transform and quantization processes may be lossy, meaning that transform and quantization processes may introduce distortion into the decoded video data.

A video decoder decodes and adds the residual data to the prediction block to produce a reconstructed video block that matches the original video block more closely than the prediction block alone. Due to the loss introduced by the transforming and quantizing of the residual data, the reconstructed block may have distortion or artifacts. One common type of artifact or distortion is referred to as blockiness, where the boundaries of the blocks used to code the video data are visible.

To further improve the quality of decoded video, a video decoder can perform one or more filtering operations on the reconstructed video blocks. Examples of these filtering operations include deblocking filtering, sample adaptive offset (SAO) filtering, and adaptive loop filtering (ALF). Parameters for these filtering operations may either be determined by a video encoder and explicitly signaled in the encoded video bitstream or may be implicitly determined by a video decoder without needing the parameters to be explicitly signaled in the encoded video bitstream.

This disclosure describes techniques related to prediction and, more specifically, to predicting blocks of video data that are encoded in a geometric partitioning mode. For blocks coded in a geometric partition mode, a video coder partitions the block into two partitions along a diagonal partition line. The size and locations of the partitions are defined by an angle of the partition line and a displacement distance of the partition line from the center of the block. The video coder predicts the block by locating first prediction samples using a motion vector for the first partition and locating second prediction samples using a motion vector for the second partition. For prediction samples near the partition line, the video coder determines a final prediction value by determining a weighted average for a sample in the first prediction samples and a sample in the second prediction samples. For prediction samples greater than a certain distance from the partition line, the video coder may set a final prediction value for the predictive block to either a sample value of the first prediction samples or a sample value of the second prediction samples, depending on whether the sample for the final predictive block is located in the first partition or the second partition. In some implementations, the video coder may still use a weighted average to set the final prediction value for the predictive block to either the sample value of the first prediction samples or the sample value of the second prediction samples, but with weights of (1 and 0) or (0 and 1).

As will be explained in more detail, for each sample near the partition line, the weight values are determined as a function of a distance of the sample to the partition line. To calculate this distance, a video coder typically has to be configured to perform sine and cosine calculations, which are computationally complex. According to the techniques of this disclosure, however, a video coder can be configured to determine an angle for a block of video data coded in a geometric partition mode, determine a power-of-2 number, e.g., a number equal to 2' with n being an integer value, based on the angle, and determine weighting values based on the power-of-2 number. Determining the weighting values based on the power-of-2 number reduces the number of sine and cosine calculations needed to determine the weighting values. For example, instead of the complex multiplication and division operations required for sine and cosine calculations, the video coder can multiply by the power-of-2 number by applying a shift operation based on the power-of-2. As this calculation is performed for multiple samples per block, the reduction in computational complexity can be significant. The techniques of this disclosure, thus produce the advantage of reducing the computational complexity required for a video coder to determine weighting values when coding blocks in a geometric partition mode.

As used in this disclosure, the term video coding generically refers to either video encoding or video decoding. Similarly, the term video coder may generically refer to a video encoder or a video decoder. Moreover, certain techniques described in this disclosure with respect to video decoding may also apply to video encoding, and vice versa. For example, often times video encoders and video decoders are configured to perform the same process, or reciprocal processes. Also, a video encoder typically performs video decoding (also called reconstruction) as part of the processes of determining how to encode video data. For example, a video encoder may perform deblocking filtering on decoded video blocks in order to determine whether a certain encoding scheme produces a desirable rate-distortion tradeoff and also so that the video encoder can perform motion estimation using the same blocks available to a video decoder when the video decoder performs motion compensation.

FIG. 1 is a block diagram illustrating an example video encoding and decoding system 100 that may perform the techniques of this disclosure. The techniques of this disclosure are generally directed to coding (encoding and/or decoding) video data. In general, video data includes any data for processing a video. Thus, video data may include raw, unencoded video, encoded video, decoded (e.g., reconstructed) video, and video metadata, such as signaling data.

As shown in FIG. 1, system 100 includes a source device 102 that provides encoded video data to be decoded and displayed by a destination device 116, in this example. In particular, source device 102 provides the video data to destination device 116 via a computer-readable medium 110. Source device 102 and destination device 116 may comprise any of a wide range of devices, including a desktop computer, a notebook (i.e., laptop) computer, a mobile device, a tablet computer, a set-top box, a telephone handset such as a smartphone, a television, a camera, a display device, a digital media player, a video gaming console, a video streaming device, a broadcast receiver device, or the like. In some cases, source device 102 and destination device 116 may be equipped for wireless communication, and thus may be referred to as wireless communication devices.

In the example of FIG. 1, source device 102 includes video source 104, memory 106, video encoder 200, and output interface 108. Destination device 116 includes input interface 122, video decoder 300, memory 120, and display device 118. In accordance with this disclosure, video encoder 200 of source device 102 and video decoder 300 of destination device 116 may be configured to apply the techniques for predicting blocks that are coded in a geometric partition mode. Thus, source device 102 represents an example of a video encoding device, while destination device 116 represents an example of a video decoding device. In other examples, a source device and a destination device may include other components or arrangements. For example, source device 102 may receive video data from an external video source, such as an external camera. Likewise, destination device 116 may interface with an external display device, rather than include an integrated display device.

System 100 as shown in FIG. 1 is merely one example. In general, any digital video encoding and/or decoding device may perform the techniques for predicting blocks that are coded in a geometric partition mode. Source device 102 and destination device 116 are merely examples of such coding devices in which source device 102 generates coded video data for transmission to destination device 116. This disclosure refers to a "coding" device as a device that performs coding (encoding and/or decoding) of data. Thus, video encoder 200 and video decoder 300 represent examples of coding devices, in particular, a video encoder and a video decoder, respectively. In some examples, source device 102 and destination device 116 may operate in a substantially symmetrical manner such that each of source device 102 and destination device 116 includes video encoding and decoding components. Hence, system 100 may support one-way or two-way video transmission between source device 102 and destination device 116, e.g., for video streaming, video playback, video broadcasting, or video telephony.

In general, video source 104 represents a source of video data (i.e., raw, unencoded video data) and provides a sequential series of pictures (also referred to as "frames") of the video data to video encoder 200, which encodes data for the pictures. Video source 104 of source device 102 may include a video capture device, such as a video camera, a video archive containing previously captured raw video, and/or a video feed interface to receive video from a video content provider. As a further alternative, video source 104 may generate computer graphics-based data as the source video, or a combination of live video, archived video, and computer-generated video. In each case, video encoder 200 encodes the captured, pre-captured, or computer-generated video data. Video encoder 200 may rearrange the pictures from the received order (sometimes referred to as "display order") into a coding order for coding. Video encoder 200 may generate a bitstream including encoded video data. Source device 102 may then output the encoded video data via output interface 108 onto computer-readable medium 110 for reception and/or retrieval by, e.g., input interface 122 of destination device 116.

Memory 106 of source device 102 and memory 120 of destination device 116 represent general purpose memories. In some examples, memories 106, 120 may store raw video data, e.g., raw video from video source 104 and raw, decoded video data from video decoder 300. Additionally or alternatively, memories 106, 120 may store software instructions executable by, e.g., video encoder 200 and video decoder 300, respectively. Although memory 106 and memory 120 are shown separately from video encoder 200 and video decoder 300 in this example, it should be understood that video encoder 200 and video decoder 300 may also include internal memories for functionally similar or equivalent purposes. Furthermore, memories 106, 120 may store encoded video data, e.g., output from video encoder 200 and input to video decoder 300. In some examples, portions of memories 106, 120 may be allocated as one or more video buffers, e.g., to store raw, decoded, and/or encoded video data.

Computer-readable medium 110 may represent any type of medium or device capable of transporting the encoded video data from source device 102 to destination device 116. In one example, computer-readable medium 110 represents a communication medium to enable source device 102 to transmit encoded video data directly to destination device 116 in real-time, e.g., via a radio frequency network or computer-based network. Output interface 108 may modulate a transmission signal including the encoded video data, and input interface 122 may demodulate the received transmission signal, according to a communication standard, such as a wireless communication protocol. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 102 to destination device 116.

In some examples, source device 102 may output encoded data from output interface 108 to storage device 112. Similarly, destination device 116 may access encoded data from storage device 112 via input interface 122. Storage device 112 may include any of a variety of distributed or locally accessed data storage media such as a hard drive, Blu-ray discs, DVDs, CD-ROMs, flash memory, volatile or non-volatile memory, or any other suitable digital storage media for storing encoded video data.

In some examples, source device 102 may output encoded video data to file server 114 or another intermediate storage device that may store the encoded video data generated by source device 102. Destination device 116 may access stored video data from file server 114 via streaming or download.

File server 114 may be any type of server device capable of storing encoded video data and transmitting that encoded video data to the destination device 116. File server 114 may represent a web server (e.g., for a website), a server configured to provide a file transfer protocol service (such as File Transfer Protocol (FTP) or File Delivery over Unidirectional Transport (FLUTE) protocol), a content delivery network (CDN) device, a hypertext transfer protocol (HTTP) server, a Multimedia Broadcast Multicast Service (MBMS) or Enhanced MBMS (eMBMS) server, and/or a network attached storage (NAS) device. File server 114 may, additionally or alternatively, implement one or more HTTP streaming protocols, such as Dynamic Adaptive Streaming over HTTP (DASH), HTTP Live Streaming (HLS), Real Time Streaming Protocol (RTSP), HTTP Dynamic Streaming, or the like.

Destination device 116 may access encoded video data from file server 114 through any standard data connection, including an Internet connection. This may include a wireless channel (e.g., a Wi-Fi connection), a wired connection (e.g., digital subscriber line (DSL), cable modem, etc.), or a combination of both that is suitable for accessing encoded video data stored on file server 114. Input interface 122 may be configured to operate according to any one or more of the various protocols discussed above for retrieving or receiving media data from file server 114, or other such protocols for retrieving media data.

Output interface 108 and input interface 122 may represent wireless transmitters/receivers, modems, wired networking components (e.g., Ethernet cards), wireless communication components that operate according to any of a variety of IEEE 802.11 standards, or other physical components. In examples where output interface 108 and input interface 122 comprise wireless components, output interface 108 and input interface 122 may be configured to transfer data, such as encoded video data, according to a cellular communication standard, such as 4G, 4G-LTE (Long-Term Evolution), LTE Advanced, 5G, or some other wireless communication standard. In some examples where output interface 108 comprises a wireless transmitter, output interface 108 and input interface 122 may be configured to transfer data, such as encoded video data, according to other wireless standards, such as an IEEE 802.11 specification, an IEEE 802.15 specification (e.g., ZigBee™), a Bluetooth™ standard, or the like. In some examples, source device 102 and/or destination device 116 may include respective system-on-a-chip (SoC) devices. For example, source device 102 may include an SoC device to perform the functionality attributed to video encoder 200 and/or output interface 108, and destination device 116 may include an SoC device to perform the functionality attributed to video decoder 300 and/or input interface 122.

The techniques of this disclosure may be applied to video coding in support of any of a variety of multimedia applications, such as over-the-air television broadcasts, cable television transmissions, satellite television transmissions, Internet streaming video transmissions, such as dynamic adaptive streaming over HTTP (DASH), digital video that is encoded onto a data storage medium, decoding of digital video stored on a data storage medium, or other applications.

Input interface 122 of destination device 116 receives an encoded video bitstream from computer-readable medium 110 (e.g., a communication medium, storage device 112, file server 114, or the like). The encoded video bitstream may include signaling information defined by video encoder 200, which is also used by video decoder 300, such as syntax elements having values that describe characteristics and/or processing of video blocks or other coded units (e.g., slices, pictures, groups of pictures, sequences, or the like). Display device 118 displays decoded pictures of the decoded video data to a user. Display device 118 may represent any of a variety of display devices such as a liquid crystal display (LCD), a plasma display, an organic light emitting diode (OLED) display, or another type of display device.

Although not shown in FIG. 1, in some examples, video encoder 200 and video decoder 300 may each be integrated with an audio encoder and/or audio decoder, and may include appropriate MUX-DEMUX units, or other hardware and/or software, to handle multiplexed streams including both audio and video in a common data stream. If applicable, MUX-DEMUX units may conform to the ITU H.223 multiplexer protocol, or other protocols such as the user datagram protocol (UDP).

Video encoder 200 and video decoder 300 each may be implemented as any of a variety of suitable encoder and/or decoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of video encoder 200 and video decoder 300 may be included in one or more encoders or decoders, either of which may be integrated as part of a combined encoder/decoder (CODEC) in a respective device. A device including video encoder 200 and/or video decoder 300 may comprise an integrated circuit, a microprocessor, and/or a wireless communication device, such as a cellular telephone.

Video encoder 200 and video decoder 300 may operate according to a video coding standard, such as ITU-T H.265, also referred to as High Efficiency Video Coding (HEVC) or extensions thereto, such as the multi-view and/or scalable video coding extensions. Alternatively, video encoder 200 and video decoder 300 may operate according to other proprietary or industry standards, such as ITU-T H.266, also referred to as Versatile Video Coding (VVC). A draft of the VVC standard is described in Bross, et al. "Versatile Video Coding (Draft 6)," Joint Video Experts Team (JVET) of ITU-T SG 16 WP 3 and ISO/IEC JTC 1/SC 29/WG 11, 15$^{th}$ Meeting: Gothenburg, SE, 3-12 Jul. 2019, JVET-O2001-vE (hereinafter "VVC Draft 6"). Another draft of the VVC standard is described in Bross, et al. "Versatile Video Coding (Draft 10)," Joint Video Experts Team (JVET) of ITU-T SG 16 WP 3 and ISO/IEC JTC 1/SC 29/WG 11, 18$^{th}$ Meeting: by teleconference, 22 Jun.-1 Jul. 2020, JVET-S2001-vA (hereinafter "VVC Draft 10"). The techniques of this disclosure, however, are not limited to any particular coding standard.

In general, video encoder 200 and video decoder 300 may perform block-based coding of pictures. The term "block" generally refers to a structure including data to be processed (e.g., encoded, decoded, or otherwise used in the encoding and/or decoding process). For example, a block may include a two-dimensional matrix of samples of luminance and/or chrominance data. In general, video encoder 200 and video decoder 300 may code video data represented in a YUV (e.g., Y, Cb, Cr) format. That is, rather than coding red, green, and blue (RGB) data for samples of a picture, video encoder 200 and video decoder 300 may code luminance and chrominance components, where the chrominance components may include both red hue and blue hue chrominance components. In some examples, video encoder 200 converts received RGB formatted data to a YUV representation prior to encoding, and video decoder 300 converts the YUV representation to the RGB format. Alternatively, pre- and post-processing units (not shown) may perform these conversions.

This disclosure may generally refer to coding (e.g., encoding and decoding) of pictures to include the process of encoding or decoding data of the picture. Similarly, this disclosure may refer to coding of blocks of a picture to include the process of encoding or decoding data for the blocks, e.g., prediction and/or residual coding. An encoded video bitstream generally includes a series of values for syntax elements representative of coding decisions (e.g., coding modes) and partitioning of pictures into blocks. Thus, references to coding a picture or a block should generally be understood as coding values for syntax elements forming the picture or block.

HEVC defines various blocks, including coding units (CUs), prediction units (PUs), and transform units (TUs). According to HEVC, a video coder (such as video encoder 200) partitions a coding tree unit (CTU) into CUs according to a quadtree structure. That is, the video coder partitions CTUs and CUs into four equal, non-overlapping squares, and each node of the quadtree has either zero or four child nodes. Nodes without child nodes may be referred to as "leaf nodes," and CUs of such leaf nodes may include one or more PUs and/or one or more TUs. The video coder may further partition PUs and TUs. For example, in HEVC, a residual quadtree (RQT) represents partitioning of TUs. In HEVC, PUs represent inter-prediction data, while TUs represent residual data. CUs that are intra-predicted include intra-prediction information, such as an intra-mode indication.

As another example, video encoder 200 and video decoder 300 may be configured to operate according to VVC. According to VVC, a video coder (such as video encoder 200) partitions a picture into a plurality of coding tree units (CTUs). Video encoder 200 may partition a CTU according to a tree structure, such as a quadtree-binary tree (QTBT) structure or Multi-Type Tree (MTT) structure. The QTBT structure removes the concepts of multiple partition types, such as the separation between CUs, PUs, and TUs of HEVC. A QTBT structure includes two levels: a first level partitioned according to quadtree partitioning, and a second level partitioned according to binary tree partitioning. A root node of the QTBT structure corresponds to a CTU. Leaf nodes of the binary trees correspond to coding units (CUs).

In an MTT partitioning structure, blocks may be partitioned using a quadtree (QT) partition, a binary tree (BT) partition, and one or more types of triple tree (TT) (also called ternary tree (TT)) partitions. A triple or ternary tree partition is a partition where a block is split into three sub-blocks. In some examples, a triple or ternary tree partition divides a block into three sub-blocks without dividing the original block through the center. The partitioning types in MTT (e.g., QT, BT, and TT), may be symmetrical or asymmetrical.

In some examples, video encoder 200 and video decoder 300 may use a single QTBT or MTT structure to represent each of the luminance and chrominance components, while in other examples, video encoder 200 and video decoder 300 may use two or more QTBT or MTT structures, such as one QTBT/MTT structure for the luminance component and another QTBT/MTT structure for both chrominance components (or two QTBT/MTT structures for respective chrominance components).

Video encoder 200 and video decoder 300 may be configured to use quadtree partitioning per HEVC, QTBT partitioning, MTT partitioning, or other partitioning structures. For purposes of explanation, the description of the techniques of this disclosure is presented with respect to QTBT partitioning. However, it should be understood that the techniques of this disclosure may also be applied to video coders configured to use quadtree partitioning, or other types of partitioning as well.

In some examples, a CTU includes a coding tree block (CTB) of luma samples, two corresponding CTBs of chroma samples of a picture that has three sample arrays, or a CTB of samples of a monochrome picture or a picture that is coded using three separate color planes and syntax structures used to code the samples. A CTB may be an N×N block of samples for some value of N such that the division of a component into CTBs is a partitioning. A component is an array or single sample from one of the three arrays (luma and two chroma) that compose a picture in 4:2:0, 4:2:2, or 4:4:4 color format or the array or a single sample of the array that compose a picture in monochrome format. In some examples, a coding block is an M×N block of samples for some values of M and N such that a division of a CTB into coding blocks is a partitioning.

The blocks (e.g., CTUs or CUs) may be grouped in various ways in a picture. As one example, a brick may refer to a rectangular region of CTU rows within a particular tile in a picture. A tile may be a rectangular region of CTUs within a particular tile column and a particular tile row in a picture. A tile column refers to a rectangular region of CTUs having a height equal to the height of the picture and a width specified by syntax elements (e.g., such as in a picture parameter set). A tile row refers to a rectangular region of CTUs having a height specified by syntax elements (e.g., such as in a picture parameter set) and a width equal to the width of the picture.

In some examples, a tile may be partitioned into multiple bricks, each of which may include one or more CTU rows within the tile. A tile that is not partitioned into multiple bricks may also be referred to as a brick. However, a brick that is a true subset of a tile may not be referred to as a tile.

The bricks in a picture may also be arranged in a slice. A slice may be an integer number of bricks of a picture that may be exclusively contained in a single network abstraction layer (NAL) unit. In some examples, a slice includes either a number of complete tiles or only a consecutive sequence of complete bricks of one tile.

This disclosure may use "N×N" and "N by N" interchangeably to refer to the sample dimensions of a block (such as a CU or other video block) in terms of vertical and horizontal dimensions, e.g., 16×16 samples or 16 by 16 samples. In general, a 16×16 CU will have 16 samples in a vertical direction (y=16) and 16 samples in a horizontal direction (x=16). Likewise, an N×N CU generally has N samples in a vertical direction and N samples in a horizontal direction, where N represents a nonnegative integer value. The samples in a CU may be arranged in rows and columns. Moreover, CUs need not necessarily have the same number of samples in the horizontal direction as in the vertical direction. For example, CUs may comprise N×M samples, where M is not necessarily equal to N.

Video encoder 200 encodes video data for CUs representing prediction and/or residual information, and other information. The prediction information indicates how the CU is to be predicted in order to form a prediction block for the CU. The residual information generally represents sample-by-sample differences between samples of the CU prior to encoding and the prediction block.

To predict a CU, video encoder 200 may generally form a prediction block for the CU through inter-prediction or intra-prediction. Inter-prediction generally refers to predicting the CU from data of a previously coded picture, whereas intra-prediction generally refers to predicting the CU from previously coded data of the same picture. To perform inter-prediction, video encoder 200 may generate the prediction block using one or more motion vectors. Video encoder 200 may generally perform a motion search to identify a reference block that closely matches the CU, e.g., in terms of differences between the CU and the reference block. Video encoder 200 may calculate a difference metric using a sum of absolute difference (SAD), sum of squared differences (SSD), mean absolute difference (MAD), mean squared differences (MSD), or other such difference calculations to determine whether a reference block closely matches the current CU. In some examples, video encoder 200 may predict the current CU using uni-directional prediction or bi-directional prediction.

Some examples of VVC also provide an affine motion compensation mode, which may be considered an inter-prediction mode. In affine motion compensation mode, video encoder 200 may determine two or more motion vectors that represent non-translational motion, such as zoom in or out, rotation, perspective motion, or other irregular motion types.

To perform intra-prediction, video encoder 200 may select an intra-prediction mode to generate the prediction block. Some examples of VVC provide sixty-seven intra-prediction modes, including various directional modes, as well as planar mode and DC mode. In general, video encoder 200 selects an intra-prediction mode that describes neighboring samples to a current block (e.g., a block of a CU) from which to predict samples of the current block. Such samples may generally be above, above and to the left, or to the left of the current block in the same picture as the current block, assuming video encoder 200 codes CTUs and CUs in raster scan order (left to right, top to bottom).

Video encoder 200 encodes data representing the prediction mode for a current block. For example, for inter-prediction modes, video encoder 200 may encode data representing which of the various available inter-prediction modes is used, as well as motion information for the corresponding mode. For uni-directional or bi-directional inter-prediction, for example, video encoder 200 may encode motion vectors using advanced motion vector prediction (AMVP) or merge mode. Video encoder 200 may use similar modes to encode motion vectors for affine motion compensation mode.

Following prediction, such as intra-prediction or inter-prediction of a block, video encoder 200 may calculate residual data for the block. The residual data, such as a residual block, represents sample by sample differences between the block and a prediction block for the block, formed using the corresponding prediction mode. Video encoder 200 may apply one or more transforms to the residual block, to produce transformed data in a transform domain instead of the sample domain. For example, video encoder 200 may apply a discrete cosine transform (DCT), an integer transform, a wavelet transform, or a conceptually similar transform to residual video data. Additionally, video encoder 200 may apply a secondary transform following the first transform, such as a mode-dependent non-separable secondary transform (MDNSST), a signal dependent transform, a Karhunen-Loeve transform (KLT), or the like. Video encoder 200 produces transform coefficients following application of the one or more transforms.

As noted above, following any transforms to produce transform coefficients, video encoder 200 may perform quantization of the transform coefficients. Quantization generally refers to a process in which transform coefficients are quantized to possibly reduce the amount of data used to represent the transform coefficients, providing further compression. By performing the quantization process, video encoder 200 may reduce the bit depth associated with some or all of the transform coefficients. For example, video encoder 200 may round an n-bit value down to an m-bit value during quantization, where n is greater than m. In some examples, to perform quantization, video encoder 200 may perform a bitwise right-shift of the value to be quantized.

Following quantization, video encoder 200 may scan the transform coefficients, producing a one-dimensional vector from the two-dimensional matrix including the quantized transform coefficients. The scan may be designed to place higher energy (and therefore lower frequency) transform coefficients at the front of the vector and to place lower energy (and therefore higher frequency) transform coefficients at the back of the vector. In some examples, video encoder 200 may utilize a predefined scan order to scan the quantized transform coefficients to produce a serialized vector, and then entropy encode the quantized transform coefficients of the vector. In other examples, video encoder 200 may perform an adaptive scan. After scanning the quantized transform coefficients to form the one-dimensional vector, video encoder 200 may entropy encode the one-dimensional vector, e.g., according to context-adaptive binary arithmetic coding (CABAC). Video encoder 200 may also entropy encode values for syntax elements describing metadata associated with the encoded video data for use by video decoder 300 in decoding the video data.

To perform CABAC, video encoder 200 may assign a context within a context model to a symbol to be transmitted. The context may relate to, for example, whether neighboring values of the symbol are zero-valued or not. The probability determination may be based on a context assigned to the symbol.

Video encoder 200 may further generate syntax data, such as block-based syntax data, picture-based syntax data, and sequence-based syntax data, to video decoder 300, e.g., in a picture header, a block header, a slice header, or other syntax data, such as a sequence parameter set (SPS), picture parameter set (PPS), or video parameter set (VPS). Video decoder 300 may likewise decode such syntax data to determine how to decode corresponding video data.

In this manner, video encoder 200 may generate a bitstream including encoded video data, e.g., syntax elements describing partitioning of a picture into blocks (e.g., CUs) and prediction and/or residual information for the blocks. Ultimately, video decoder 300 may receive the bitstream and decode the encoded video data.

In general, video decoder 300 performs a reciprocal process to that performed by video encoder 200 to decode the encoded video data of the bitstream. For example, video decoder 300 may decode values for syntax elements of the bitstream using CABAC in a manner substantially similar to, albeit reciprocal to, the CABAC encoding process of video encoder 200. The syntax elements may define partitioning information for partitioning of a picture into CTUs, and partitioning of each CTU according to a corresponding partition structure, such as a QTBT structure, to define CUs of the CTU. The syntax elements may further define prediction and residual information for blocks (e.g., CUs) of video data.

The residual information may be represented by, for example, quantized transform coefficients. Video decoder 300 may inverse quantize and inverse transform the quantized transform coefficients of a block to reproduce a residual block for the block. Video decoder 300 uses a signaled prediction mode (intra- or inter-prediction) and related prediction information (e.g., motion information for inter-prediction) to form a prediction block for the block. Video decoder 300 may then combine the prediction block and the residual block (on a sample-by-sample basis) to reproduce the original block. Video decoder 300 may perform additional processing, such as performing a deblocking process to reduce visual artifacts along boundaries of the block.

This disclosure may generally refer to "signaling" certain information, such as syntax elements. The term "signaling" may generally refer to the communication of values for syntax elements and/or other data used to decode encoded video data. That is, video encoder 200 may signal values for syntax elements in the bitstream. In general, signaling refers to generating a value in the bitstream. As noted above, source device 102 may transport the bitstream to destination device 116 substantially in real time, or not in real time, such as might occur when storing syntax elements to storage device 112 for later retrieval by destination device 116.

Figure 2A:
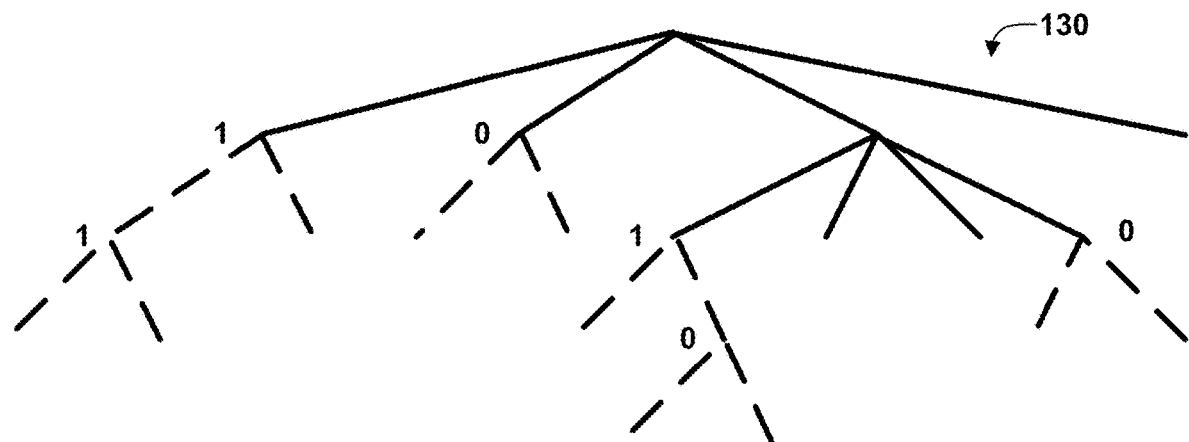
FIGS. 2A and 2B are conceptual diagrams illustrating an example quadtree binary tree (QTBT) structure, and a corresponding coding tree unit (CTU).
Figure 2B:
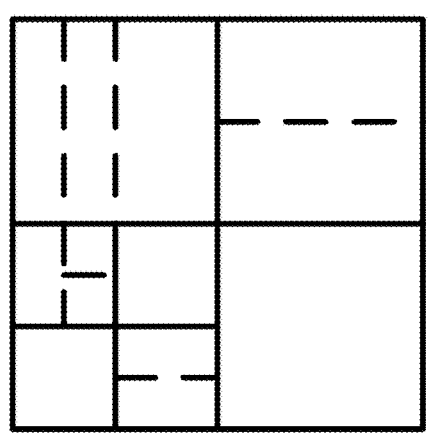

FIGS. 2A and 2B are conceptual diagrams illustrating an example quadtree binary tree (QTBT) structure 130, and a corresponding coding tree unit (CTU) 132. The solid lines represent quadtree splitting, and dotted lines indicate binary tree splitting. In each split (i.e., non-leaf) node of the binary tree, one flag is signaled to indicate which splitting type (i.e., horizontal or vertical) is used, where 0 indicates horizontal splitting and 1 indicates vertical splitting in this example. For the quadtree splitting, there is no need to indicate the splitting type, because quadtree nodes split a block horizontally and vertically into 4 sub-blocks with equal size. Accordingly, video encoder 200 may encode, and video decoder 300 may decode, syntax elements (such as splitting information) for a region tree level of QTBT structure 130 (i.e., the solid lines) and syntax elements (such as splitting information) for a prediction tree level of QTBT structure 130 (i.e., the dashed lines). Video encoder 200 may encode, and video decoder 300 may decode, video data, such as prediction and transform data, for CUs represented by terminal leaf nodes of QTBT structure 130.

In general, CTU 132 of FIG. 2B may be associated with parameters defining sizes of blocks corresponding to nodes of QTBT structure 130 at the first and second levels. These parameters may include a CTU size (representing a size of CTU 132 in samples), a minimum quadtree size (MinQTSize, representing a minimum allowed quadtree leaf node size), a maximum binary tree size (MaxBTSize, representing a maximum allowed binary tree root node size), a maximum binary tree depth (MaxBTDepth, representing a maximum allowed binary tree depth), and a minimum binary tree size (MinBTSize, representing the minimum allowed binary tree leaf node size).

The root node of a QTBT structure corresponding to a CTU may have four child nodes at the first level of the QTBT structure, each of which may be partitioned according to quadtree partitioning. That is, nodes of the first level are either leaf nodes (having no child nodes) or have four child nodes. The example of QTBT structure 130 represents such nodes as including the parent node and child nodes having solid lines for branches. If nodes of the first level are not larger than the maximum allowed binary tree root node size (MaxBTSize), then the nodes can be further partitioned by respective binary trees. The binary tree splitting of one node can be iterated until the nodes resulting from the split reach the minimum allowed binary tree leaf node size (MinBTSize) or the maximum allowed binary tree depth (MaxBTDepth). The example of QTBT structure 130 represents such nodes as having dashed lines for branches. The binary tree leaf node is referred to as a coding unit (CU), which is used for prediction (e.g., intra-picture or inter-picture prediction) and transform, without any further partitioning. As discussed above, CUs may also be referred to as "video blocks" or "blocks."

In one example of the QTBT partitioning structure, the CTU size is set as 128×128 (luma samples and two corresponding 64×64 chroma samples), the MinQTSize is set as 16×16, the MaxBTSize is set as 64×64, the MinBTSize (for both width and height) is set as 4, and the MaxBTDepth is set as 4. The quadtree partitioning is applied to the CTU first to generate quad-tree leaf nodes. The quadtree leaf nodes may have a size from 16×16 (i.e., the MinQTSize) to 128×128 (i.e., the CTU size). If the quadtree leaf node is 128×128, the leaf quadtree node will not be further split by the binary tree, because the size exceeds the MaxBTSize (i.e., 64×64, in this example). Otherwise, the quadtree leaf node will be further partitioned by the binary tree. Therefore, the quadtree leaf node is also the root node for the binary tree and has the binary tree depth as 0. When the binary tree depth reaches MaxBTDepth (4, in this example), no further splitting is permitted. A binary tree node having a width equal to MinBTSize (4, in this example) implies that no further vertical splitting (that is, dividing of the width) is permitted for that binary tree node. Similarly, a binary tree node having a height equal to MinBTSize implies no further horizontal splitting (that is, dividing of the height) is permitted for that binary tree node. As noted above, leaf nodes of the binary tree are referred to as CUs, and are further processed according to prediction and transform without further partitioning.

As will be described in more detail below, video encoder 200 and video decoder 300 may each be configured to determine that a block of video data is encoded in a geometric partition mode; determine an angle for the block of video data for the geometric partition mode; determine a separation line displacement relative to a center of the block for the geometric partition mode; partition the block into a first partition and a second partition based on the angle and the separation line displacement; locate first predictive samples for the block of video data using a motion vector for the first partition; locate second predictive samples for the block of video data using a motion vector for the second partition; determine a power-of-2 number based on the angle for the block of video data; determine weighting values based on the power-of-2 number; perform a blending operation on the first predictive samples and the second predictive samples to determine a prediction block for the block of video data; and output the prediction block. By determining a power-of-2 number based on the angle for the block of video data and determining weighting values based on the power-of-2 number, video encoder 200 and video decoder 300 may advantageously be configured to encode and decode blocks of video data in a geometric partition mode in a manner that is less computationally complex compared to existing techniques. For example, video encoder 200 and video decoder 300 may utilize shift operations when determining a prediction block for encoding or decoding, rather than sine and cosine operations. Shift operations may be substantially less computationally complex, as compared to sine and cosine operations.

Figure 3:
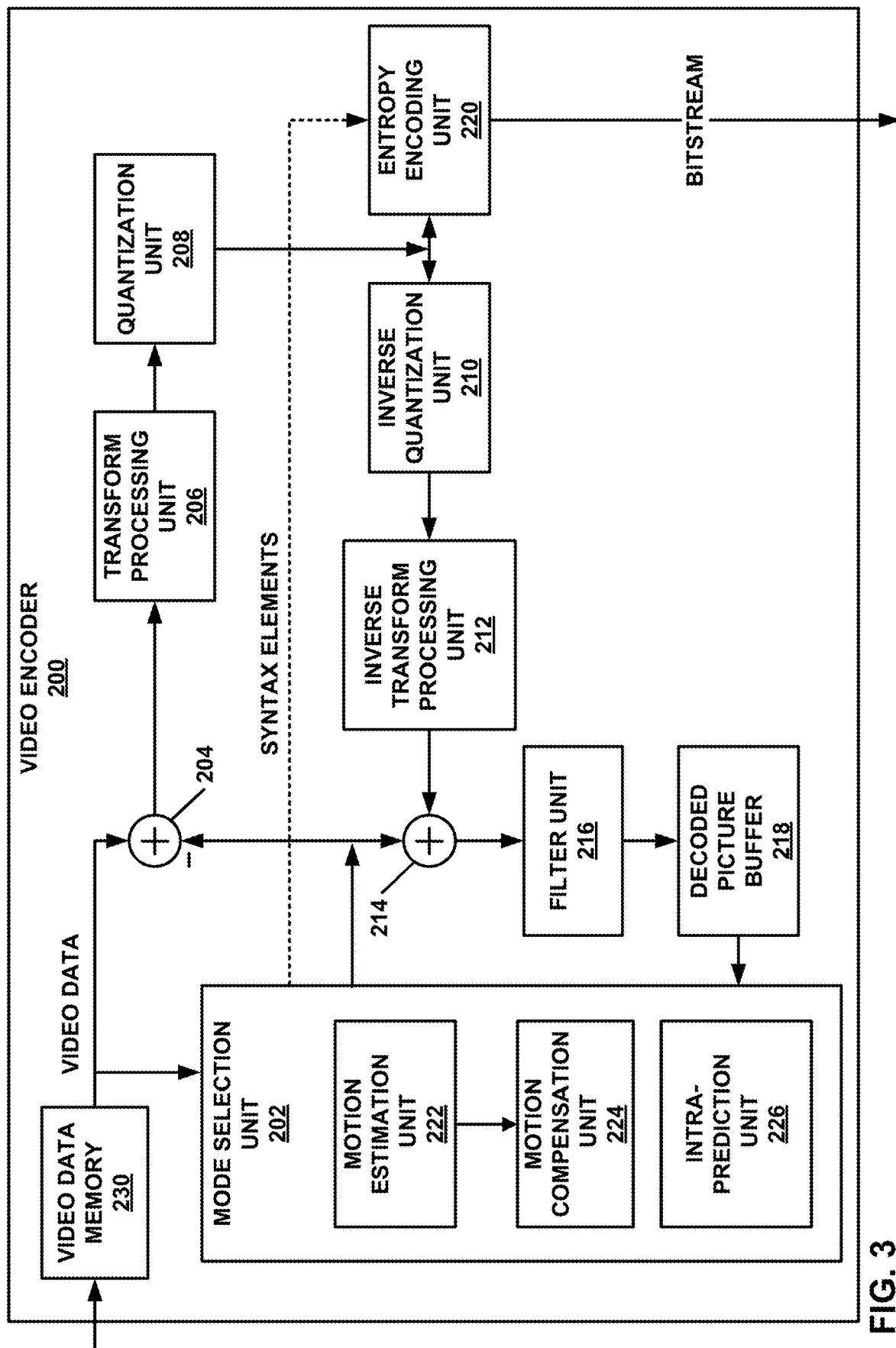
FIG. 3 is a block diagram illustrating an example video encoder that may perform the techniques of this disclosure.

FIG. 3 is a block diagram illustrating an example video encoder 200 that may perform the techniques of this disclosure. FIG. 3 is provided for purposes of explanation and should not be considered limiting of the techniques as broadly exemplified and described in this disclosure. For purposes of explanation, this disclosure describes video encoder 200 in the context of video coding standards such as the HEVC video coding standard and the H.266 video coding standard in development. However, the techniques of this disclosure are not limited to these video coding standards, and are applicable generally to video encoding and decoding.

In the example of FIG. 3, video encoder 200 includes video data memory 230, mode selection unit 202, residual generation unit 204, transform processing unit 206, quantization unit 208, inverse quantization unit 210, inverse transform processing unit 212, reconstruction unit 214, filter unit 216, decoded picture buffer (DPB) 218, and entropy encoding unit 220. Any or all of video data memory 230, mode selection unit 202, residual generation unit 204, transform processing unit 206, quantization unit 208, inverse quantization unit 210, inverse transform processing unit 212, reconstruction unit 214, filter unit 216, DPB 218, and entropy encoding unit 220 may be implemented in one or more processors or in processing circuitry. Moreover, video encoder 200 may include additional or alternative processors or processing circuitry to perform these and other functions.

Video data memory 230 may store video data to be encoded by the components of video encoder 200. Video encoder 200 may receive the video data stored in video data memory 230 from, for example, video source 104 (FIG. 1). DPB 218 may act as a reference picture memory that stores reference video data for use in prediction of subsequent video data by video encoder 200. Video data memory 230 and DPB 218 may be formed by any of a variety of memory devices, such as dynamic random access memory (DRAM), including synchronous DRAM (SDRAM), magnetoresistive RAM (MRAM), resistive RAM (RRAM), or other types of memory devices. Video data memory 230 and DPB 218 may be provided by the same memory device or separate memory devices. In various examples, video data memory 230 may be on-chip with other components of video encoder 200, as illustrated, or off-chip relative to those components.

In this disclosure, reference to video data memory 230 should not be interpreted as being limited to memory internal to video encoder 200, unless specifically described as such, or memory external to video encoder 200, unless specifically described as such. Rather, reference to video data memory 230 should be understood as reference memory that stores video data that video encoder 200 receives for encoding (e.g., video data for a current block that is to be encoded). Memory 106 of FIG. 1 may also provide temporary storage of outputs from the various units of video encoder 200.

The various units of FIG. 3 are illustrated to assist with understanding the operations performed by video encoder 200. The units may be implemented as fixed-function circuits, programmable circuits, or a combination thereof. Fixed-function circuits refer to circuits that provide particular functionality, and are preset on the operations that can be performed. Programmable circuits refer to circuits that can be programmed to perform various tasks, and provide flexible functionality in the operations that can be performed. For instance, programmable circuits may execute software or firmware that cause the programmable circuits to operate in the manner defined by instructions of the software or firmware. Fixed-function circuits may execute software instructions (e.g., to receive parameters or output parameters), but the types of operations that the fixed-function circuits perform are generally immutable. In some examples, one or more of the units may be distinct circuit blocks (fixed-function or programmable), and in some examples, one or more of the units may be integrated circuits.

Video encoder 200 may include arithmetic logic units (ALUs), elementary function units (EFUs), digital circuits, analog circuits, and/or programmable cores, formed from programmable circuits. In examples where the operations of video encoder 200 are performed using software executed by the programmable circuits, memory 106 (FIG. 1) may store the instructions (e.g., object code) of the software that video encoder 200 receives and executes, or another memory within video encoder 200 (not shown) may store such instructions.

Video data memory 230 is configured to store received video data. Video encoder 200 may retrieve a picture of the video data from video data memory 230 and provide the video data to residual generation unit 204 and mode selection unit 202. Video data in video data memory 230 may be raw video data that is to be encoded.

Mode selection unit 202 includes a motion estimation unit 222, motion compensation unit 224, and an intra-prediction unit 226. Mode selection unit 202 may include additional functional units to perform video prediction in accordance with other prediction modes. As examples, mode selection unit 202 may include a palette unit, an intra-block copy unit (which may be part of motion estimation unit 222 and/or motion compensation unit 224), an affine unit, a linear model (LM) unit, or the like.

Mode selection unit 202 generally coordinates multiple encoding passes to test combinations of encoding parameters and resulting rate-distortion values for such combinations. The encoding parameters may include partitioning of CTUs into CUs, prediction modes for the CUs, transform types for residual data of the CUs, quantization parameters for residual data of the CUs, and so on. Mode selection unit 202 may ultimately select the combination of encoding parameters having rate-distortion values that are better than the other tested combinations.

Video encoder 200 may partition a picture retrieved from video data memory 230 into a series of CTUs, and encapsulate one or more CTUs within a slice. Mode selection unit 202 may partition a CTU of the picture in accordance with a tree structure, such as the QTBT structure or the quad-tree structure of HEVC described above. As described above, video encoder 200 may form one or more CUs from partitioning a CTU according to the tree structure. Such a CU may also be referred to generally as a "video block" or "block."

In general, mode selection unit 202 also controls the components thereof (e.g., motion estimation unit 222, motion compensation unit 224, and intra-prediction unit 226) to generate a prediction block for a current block (e.g., a current CU, or in HEVC, the overlapping portion of a PU and a TU). For inter-prediction of a current block, motion estimation unit 222 may perform a motion search to identify one or more closely matching reference blocks in one or more reference pictures (e.g., one or more previously coded pictures stored in DPB 218). In particular, motion estimation unit 222 may calculate a value representative of how similar a potential reference block is to the current block, e.g., according to sum of absolute difference (SAD), sum of squared differences (SSD), mean absolute difference (MAD), mean squared differences (MSD), or the like. Motion estimation unit 222 may generally perform these calculations using sample-by-sample differences between the current block and the reference block being considered. Motion estimation unit 222 may identify a reference block having a lowest value resulting from these calculations, indicating a reference block that most closely matches the current block.

Motion estimation unit 222 may form one or more motion vectors (MVs) that defines the positions of the reference blocks in the reference pictures relative to the position of the current block in a current picture. Motion estimation unit 222 may then provide the motion vectors to motion compensation unit 224. For example, for uni-directional inter-prediction, motion estimation unit 222 may provide a single motion vector, whereas for bi-directional inter-prediction, motion estimation unit 222 may provide two motion vectors. Motion compensation unit 224 may then generate a prediction block using the motion vectors. For example, motion compensation unit 224 may retrieve data of the reference block using the motion vector. As another example, if the motion vector has fractional sample precision, motion compensation unit 224 may interpolate values for the prediction block according to one or more interpolation filters. Moreover, for bi-directional inter-prediction, motion compensation unit 224 may retrieve data for two reference blocks identified by respective motion vectors and combine the retrieved data, e.g., through sample-by-sample averaging or weighted averaging.

As another example, for intra-prediction, or intra-prediction coding, intra-prediction unit 226 may generate the prediction block from samples neighboring the current block. For example, for directional modes, intra-prediction unit 226 may generally mathematically combine values of neighboring samples and populate these calculated values in the defined direction across the current block to produce the prediction block. As another example, for DC mode, intra-prediction unit 226 may calculate an average of the neighboring samples to the current block and generate the prediction block to include this resulting average for each sample of the prediction block.

Mode selection unit 202 provides the prediction block to residual generation unit 204. Residual generation unit 204 receives a raw, unencoded version of the current block from video data memory 230 and the prediction block from mode selection unit 202. Residual generation unit 204 calculates sample-by-sample differences between the current block and the prediction block. The resulting sample-by-sample differences define a residual block for the current block. In some examples, residual generation unit 204 may also determine differences between sample values in the residual block to generate a residual block using residual differential pulse code modulation (RDPCM). In some examples, residual generation unit 204 may be formed using one or more subtractor circuits that perform binary subtraction.

In examples where mode selection unit 202 partitions CUs into PUs, each PU may be associated with a luma prediction unit and corresponding chroma prediction units. Video encoder 200 and video decoder 300 may support PUs having various sizes. As indicated above, the size of a CU may refer to the size of the luma coding block of the CU and the size of a PU may refer to the size of a luma prediction unit of the PU. Assuming that the size of a particular CU is 2N×2N, video encoder 200 may support PU sizes of 2N×2N or N×N for intra prediction, and symmetric PU sizes of 2N×2N, 2N×N, N×2N, N×N, or similar for inter prediction. Video encoder 200 and video decoder 300 may also support asymmetric partitioning for PU sizes of 2N×nU, 2N×nD, nL×2N, and nR×2N for inter prediction.

In examples where mode selection unit 202 does not further partition a CU into PUs, each CU may be associated with a luma coding block and corresponding chroma coding blocks. As above, the size of a CU may refer to the size of the luma coding block of the CU. The video encoder 200 and video decoder 300 may support CU sizes of 2N×2N, 2N×N, or N×2N.

For other video coding techniques such as an intra-block copy mode coding, an affine-mode coding, and linear model (LM) mode coding, as few examples, mode selection unit 202, via respective units associated with the coding techniques, generates a prediction block for the current block being encoded. In some examples, such as palette mode coding, mode selection unit 202 may not generate a prediction block, and instead generate syntax elements that indicate the manner in which to reconstruct the block based on a selected palette. In such modes, mode selection unit 202 may provide these syntax elements to entropy encoding unit 220 to be encoded.

As described above, residual generation unit 204 receives the video data for the current block and the corresponding prediction block. Residual generation unit 204 then generates a residual block for the current block. To generate the residual block, residual generation unit 204 calculates sample-by-sample differences between the prediction block and the current block.

Transform processing unit 206 applies one or more transforms to the residual block to generate a block of transform coefficients (referred to herein as a "transform coefficient block"). Transform processing unit 206 may apply various transforms to a residual block to form the transform coefficient block. For example, transform processing unit 206 may apply a discrete cosine transform (DCT), a directional transform, a Karhunen-Loeve transform (KLT), or a conceptually similar transform to a residual block. In some examples, transform processing unit 206 may perform multiple transforms to a residual block, e.g., a primary transform and a secondary transform, such as a rotational transform. In some examples, transform processing unit 206 does not apply transforms to a residual block.

Quantization unit 208 may quantize the transform coefficients in a transform coefficient block, to produce a quantized transform coefficient block. Quantization unit 208 may quantize transform coefficients of a transform coefficient block according to a quantization parameter (QP) value associated with the current block. Video encoder 200 (e.g., via mode selection unit 202) may adjust the degree of quantization applied to the transform coefficient blocks associated with the current block by adjusting the QP value associated with the CU. Quantization may introduce loss of information, and thus, quantized transform coefficients may have lower precision than the original transform coefficients produced by transform processing unit 206.

Inverse quantization unit 210 and inverse transform processing unit 212 may apply inverse quantization and inverse transforms to a quantized transform coefficient block, respectively, to reconstruct a residual block from the transform coefficient block. Reconstruction unit 214 may produce a reconstructed block corresponding to the current block (albeit potentially with some degree of distortion) based on the reconstructed residual block and a prediction block generated by mode selection unit 202. For example, reconstruction unit 214 may add samples of the reconstructed residual block to corresponding samples from the prediction block generated by mode selection unit 202 to produce the reconstructed block.

Filter unit 216 may perform one or more filter operations on reconstructed blocks. For example, filter unit 216 may perform deblocking operations to reduce blockiness artifacts along edges of CUs. Operations of filter unit 216 may be skipped, in some examples.

Video encoder 200 stores reconstructed blocks in DPB 218. For instance, in examples where operations of filter unit 216 are not needed, reconstruction unit 214 may store reconstructed blocks to DPB 218. In examples where operations of filter unit 216 are needed, filter unit 216 may store the filtered reconstructed blocks to DPB 218. Motion estimation unit 222 and motion compensation unit 224 may retrieve a reference picture from DPB 218, formed from the reconstructed (and potentially filtered) blocks, to inter-predict blocks of subsequently encoded pictures. In addition, intra-prediction unit 226 may use reconstructed blocks in DPB 218 of a current picture to intra-predict other blocks in the current picture.

In general, entropy encoding unit 220 may entropy encode syntax elements received from other functional components of video encoder 200. For example, entropy encoding unit 220 may entropy encode quantized transform coefficient blocks from quantization unit 208. As another example, entropy encoding unit 220 may entropy encode prediction syntax elements (e.g., motion information for inter-prediction or intra-mode information for intra-prediction) from mode selection unit 202. Entropy encoding unit 220 may perform one or more entropy encoding operations on the syntax elements, which are another example of video data, to generate entropy-encoded data. For example, entropy encoding unit 220 may perform a context-adaptive variable length coding (CAVLC) operation, a CABAC operation, a variable-to-variable (V2V) length coding operation, a syntax-based context-adaptive binary arithmetic coding (SBAC) operation, a Probability Interval Partitioning Entropy (PIPE) coding operation, an Exponential-Golomb encoding operation, or another type of entropy encoding operation on the data. In some examples, entropy encoding unit 220 may operate in bypass mode where syntax elements are not entropy encoded.

Video encoder 200 may output a bitstream that includes the entropy encoded syntax elements needed to reconstruct blocks of a slice or picture. In particular, entropy encoding unit 220 may output the bitstream.

The operations described above are described with respect to a block. Such description should be understood as being operations for a luma coding block and/or chroma coding blocks. As described above, in some examples, the luma coding block and chroma coding blocks are luma and chroma components of a CU. In some examples, the luma coding block and the chroma coding blocks are luma and chroma components of a PU.

In some examples, operations performed with respect to a luma coding block need not be repeated for the chroma coding blocks. As one example, operations to identify a motion vector (MV) and reference picture for a luma coding block need not be repeated for identifying a MV and reference picture for the chroma blocks. Rather, the MV for the luma coding block may be scaled to determine the MV for the chroma blocks, and the reference picture may be the same. As another example, the intra-prediction process may be the same for the luma coding block and the chroma coding blocks.

Video encoder 200 represents an example of a device configured to encode video data including a memory configured to store video data, and one or more processing units implemented in circuitry and configured to encode using geometric partition mode in accordance with any one or combination of techniques described in this disclosure.

Figure 4:
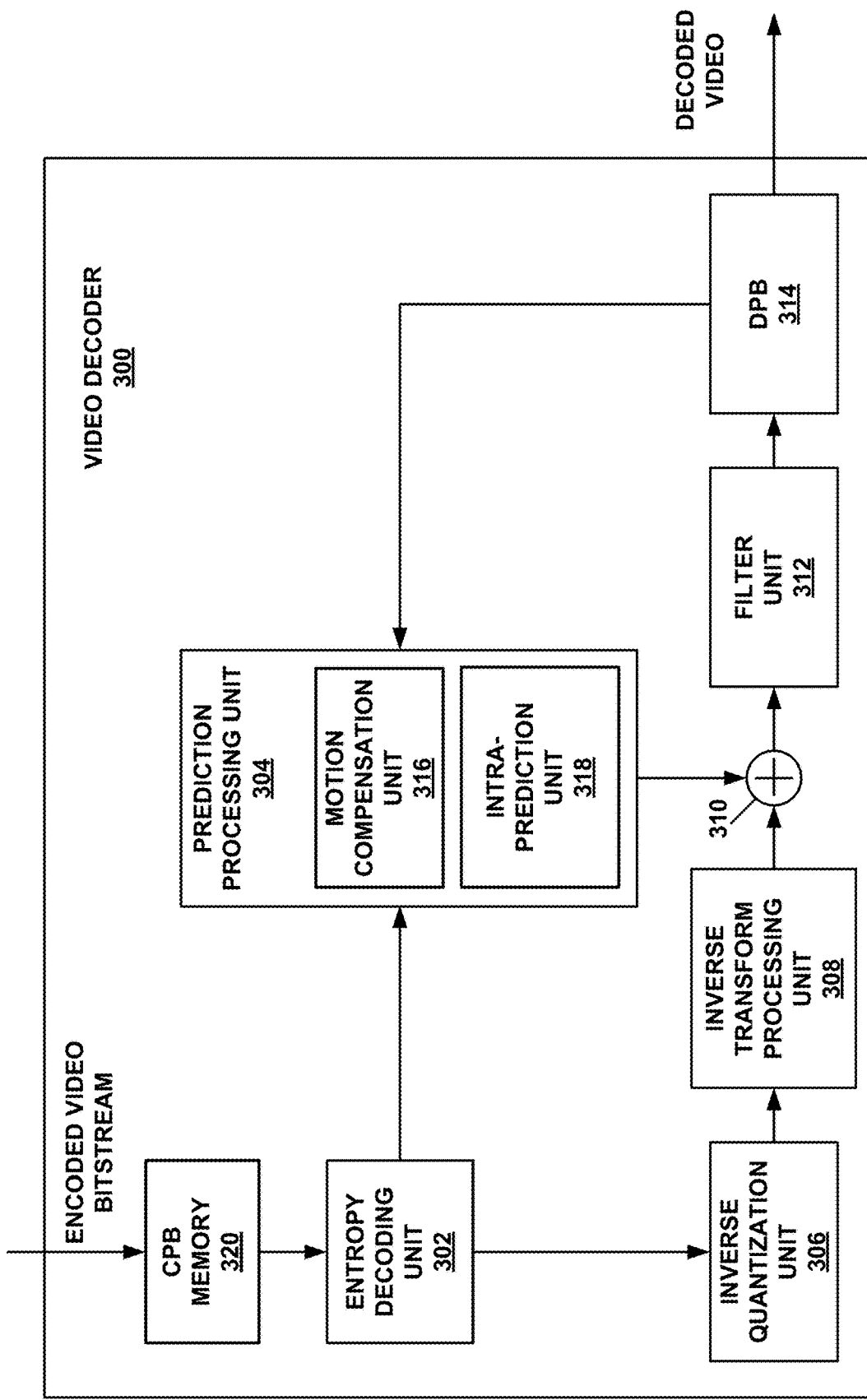
FIG. 4 is a block diagram illustrating an example video decoder that may perform the techniques of this disclosure.

FIG. 4 is a block diagram illustrating an example video decoder 300 that may perform the techniques of this disclosure. FIG. 4 is provided for purposes of explanation and is not limiting on the techniques as broadly exemplified and described in this disclosure. For purposes of explanation, this disclosure describes video decoder 300 according to the techniques of JEM, VVC, and HEVC. However, the techniques of this disclosure may be performed by video coding devices that are configured to other video coding standards.

In the example of FIG. 4, video decoder 300 includes coded picture buffer (CPB) memory 320, entropy decoding unit 302, prediction processing unit 304, inverse quantization unit 306, inverse transform processing unit 308, reconstruction unit 310, filter unit 312, and decoded picture buffer (DPB) 314. Any or all of CPB memory 320, entropy decoding unit 302, prediction processing unit 304, inverse quantization unit 306, inverse transform processing unit 308, reconstruction unit 310, filter unit 312, and DPB 314 may be implemented in one or more processors or in processing circuitry. Moreover, video decoder 300 may include additional or alternative processors or processing circuitry to perform these and other functions.

Prediction processing unit 304 includes motion compensation unit 316 and intra-prediction unit 318. Prediction processing unit 304 may include additional units to perform prediction in accordance with other prediction modes. As examples, prediction processing unit 304 may include a palette unit, an intra-block copy unit (which may form part of motion compensation unit 316), an affine unit, a linear model (LM) unit, or the like. In other examples, video decoder 300 may include more, fewer, or different functional components.

CPB memory 320 may store video data, such as an encoded video bitstream, to be decoded by the components of video decoder 300. The video data stored in CPB memory 320 may be obtained, for example, from computer-readable medium 110 (FIG. 1). CPB memory 320 may include a CPB that stores encoded video data (e.g., syntax elements) from an encoded video bitstream. Also, CPB memory 320 may store video data other than syntax elements of a coded picture, such as temporary data representing outputs from the various units of video decoder 300. DPB 314 generally stores decoded pictures, which video decoder 300 may output and/or use as reference video data when decoding subsequent data or pictures of the encoded video bitstream. CPB memory 320 and DPB 314 may be formed by any of a variety of memory devices, such as DRAM, including SDRAM, MRAM, RRAM, or other types of memory devices. CPB memory 320 and DPB 314 may be provided by the same memory device or separate memory devices. In various examples, CPB memory 320 may be on-chip with other components of video decoder 300, or off-chip relative to those components.

Additionally or alternatively, in some examples, video decoder 300 may retrieve coded video data from memory 120 (FIG. 1). That is, memory 120 may store data as discussed above with CPB memory 320. Likewise, memory 120 may store instructions to be executed by video decoder 300, when some or all of the functionality of video decoder 300 is implemented in software to be executed by processing circuitry of video decoder 300.

The various units shown in FIG. 4 are illustrated to assist with understanding the operations performed by video decoder 300. The units may be implemented as fixed-function circuits, programmable circuits, or a combination thereof. Similar to FIG. 3, fixed-function circuits refer to circuits that provide particular functionality, and are preset on the operations that can be performed. Programmable circuits refer to circuits that can be programmed to perform various tasks, and provide flexible functionality in the operations that can be performed. For instance, programmable circuits may execute software or firmware that cause the programmable circuits to operate in the manner defined by instructions of the software or firmware. Fixed-function circuits may execute software instructions (e.g., to receive parameters or output parameters), but the types of operations that the fixed-function circuits perform are generally immutable. In some examples, one or more of the units may be distinct circuit blocks (fixed-function or programmable), and in some examples, one or more of the units may be integrated circuits.

Video decoder 300 may include ALUs, EFUs, digital circuits, analog circuits, and/or programmable cores formed from programmable circuits. In examples where the operations of video decoder 300 are performed by software executing on the programmable circuits, on-chip or off-chip memory may store instructions (e.g., object code) of the software that video decoder 300 receives and executes.

Entropy decoding unit 302 may receive encoded video data from the CPB and entropy decode the video data to reproduce syntax elements. Prediction processing unit 304, inverse quantization unit 306, inverse transform processing unit 308, reconstruction unit 310, and filter unit 312 may generate decoded video data based on the syntax elements extracted from the bitstream.

In general, video decoder 300 reconstructs a picture on a block-by-block basis. Video decoder 300 may perform a reconstruction operation on each block individually (where the block currently being reconstructed, i.e., decoded, may be referred to as a "current block").

Entropy decoding unit 302 may entropy decode syntax elements defining quantized transform coefficients of a quantized transform coefficient block, as well as transform information, such as a quantization parameter (QP) and/or transform mode indication(s). Inverse quantization unit 306 may use the QP associated with the quantized transform coefficient block to determine a degree of quantization and, likewise, a degree of inverse quantization for inverse quantization unit 306 to apply. Inverse quantization unit 306 may, for example, perform a bitwise left-shift operation to inverse quantize the quantized transform coefficients. Inverse quantization unit 306 may thereby form a transform coefficient block including transform coefficients.

After inverse quantization unit 306 forms the transform coefficient block, inverse transform processing unit 308 may apply one or more inverse transforms to the transform coefficient block to generate a residual block associated with the current block. For example, inverse transform processing unit 308 may apply an inverse DCT, an inverse integer transform, an inverse Karhunen-Loeve transform (KLT), an inverse rotational transform, an inverse directional transform, or another inverse transform to the transform coefficient block.

Furthermore, prediction processing unit 304 generates a prediction block according to prediction information syntax elements that were entropy decoded by entropy decoding unit 302. For example, if the prediction information syntax elements indicate that the current block is inter-predicted, motion compensation unit 316 may generate the prediction block. In this case, the prediction information syntax elements may indicate a reference picture in DPB 314 from which to retrieve a reference block, as well as a motion vector identifying a location of the reference block in the reference picture relative to the location of the current block in the current picture. Motion compensation unit 316 may generally perform the inter-prediction process in a manner that is substantially similar to that described with respect to motion compensation unit 224 (FIG. 3).

As another example, if the prediction information syntax elements indicate that the current block is intra-predicted, intra-prediction unit 318 may generate the prediction block according to an intra-prediction mode indicated by the prediction information syntax elements. Again, intra-prediction unit 318 may generally perform the intra-prediction process in a manner that is substantially similar to that described with respect to intra-prediction unit 226 (FIG. 3). Intra-prediction unit 318 may retrieve data of neighboring samples to the current block from DPB 314.

Reconstruction unit 310 may reconstruct the current block using the prediction block and the residual block. For example, reconstruction unit 310 may add samples of the residual block to corresponding samples of the prediction block to reconstruct the current block.

Filter unit 312 may perform one or more filter operations on reconstructed blocks. For example, filter unit 312 may perform deblocking operations to reduce blockiness artifacts along edges of the reconstructed blocks. Operations of filter unit 312 are not necessarily performed in all examples.

Video decoder 300 may store the reconstructed blocks in DPB 314. For instance, in examples where operations of filter unit 312 are not performed, reconstruction unit 310 may store reconstructed blocks to DPB 314. In examples where operations of filter unit 312 are performed, filter unit 312 may store the filtered reconstructed blocks to DPB 314. As discussed above, DPB 314 may provide reference information, such as samples of a current picture for intra-prediction and previously decoded pictures for subsequent motion compensation, to prediction processing unit 304. Moreover, video decoder 300 may output decoded pictures (e.g., decoded video) from DPB 314 for subsequent presentation on a display device, such as display device 118 of FIG. 1.

In this manner, video decoder 300 represents an example of a video decoding device including a memory configured to store video data, and one or more processing units implemented in circuitry and configured to decode using geometric partition mode in accordance with any one or combination of techniques described in this disclosure.

As described above, video compression technologies perform spatial and temporal prediction to reduce or remove the redundancy inherent in input video signals. In order to reduce temporal redundancy (that is, similarities between video signals in neighboring frames), motion estimation is carried out to track the movement of video objects. Motion estimation may be done on blocks of variable sizes. The object displacement as the outcome of motion estimation is commonly known as motion vectors. Motion vectors may have half-pixel, quarter-pixel, $1/16^{th}$-pixel precisions (or any finer precisions). This allows the video coder to track motion field in higher precision than integer-pixel locations and, hence, obtain a better prediction block. When motion vectors with fractional pixel values are used, interpolation operations are carried out.

After motion estimation, the best motion vector may be decided using a certain rate-distortion model. Then, the prediction video block (i.e., prediction block) is formed by motion compensation using the best motion vector. The residual video block is formed by subtracting the prediction video block from the original video block. A transform is then applied on the residual block. The transform coefficients are then quantized and entropy-coded to further reduce bit rate.

As described above, FIG. 3 is a block diagram of video encoder 200 that uses block-based motion estimation to reduce temporal redundancy. Some video coding systems, such as the H.264/AVC or HEVC standard, also allows spatial prediction for intra coded blocks, which is not depicted in FIG. 3.

When triangle partition mode is used, the CU is split evenly into two triangle shaped partitions, using either the diagonal split or the anti-diagonal split, as illustrated in FIGS. 5A and 5B. For example, FIGS. 5A and 5B illustrate blocks 500A and 500B, respectively. Block 500A is partitioned into first partition 502A and second partition 504A, and block 500B is partitioned into first partition 502B and second partition 504B.

Each triangle partition in the CU is inter-predicted using its own motion. Only uni-prediction may be allowed for each partition. That is, each partition (e.g., partition 502A, 504A, 502B, or 504B) has one motion vector and one reference index into a reference picture list. The uni-prediction motion constraint is applied to ensure that, same as the conventional bi-prediction, only two motion compensated prediction are needed for each CU (i.e., there are only two blocks that can be blended together to form a prediction block). For example, partition 502A and partition 504A may each have only one motion vector, meaning that block 500A is limited to only two motion vectors.

The uni-prediction motion for each partition (e.g., first motion vector for first partition 502A and second motion vector for second partition 504A, and similar to partitions 502B and 504B) is derived from a uni-prediction candidate list constructed using the process described with respect to uni-prediction candidate list construction. If the CU-level flag indicates that the current CU is coded using the triangle partition mode and if triangle partition mode is used, then a flag indicating the direction of the triangle partition (diagonal or anti-diagonal), and two merge indices (one for each partition), are further signalled. FIGS. 5A and 5B illustrate the example of diagonal and anti-diagonal partitioning with respective dashed partition lines.

After predicting each of the triangle partitions (e.g., determining a first prediction block for first partition 502A or 502B and a second prediction block for second partition 504A or 504B based on respective motion vectors), the sample values along the diagonal or anti-diagonal edge (e.g., partition line) are adjusted using a blending processing with adaptive weights. For example, video encoder 200 and video decoder 300 may generate a final prediction block by blending with adaptive weights the first partition block and the second partition block. This is the prediction signal (e.g., final prediction block) for the whole CU and transform and quantization processes may be applied to the whole CU as in other prediction modes. The motion field of a CU predicted using the triangle partition mode is stored in 4×4 units as described with respect to blending along the triangle partition edge.

The following describes uni-prediction candidate list construction. The uni-prediction candidate list includes five uni-prediction motion vector candidates. The motion vector candidates are derived from seven neighboring blocks including five spatial neighboring blocks (labelled 601-605 of block 600 in FIG. 6) and two temporal co-located blocks (labelled 606 and 607 in FIG. 6). The motion vectors of the seven neighboring blocks are collected and put into the uni-prediction candidate list according to the following order: first, the motion vectors of the uni-predicted neighboring blocks; then, for the bi-predicted neighboring blocks, the L0 (list 0) motion vectors (that is, the L0 motion vector part of the bi-prediction MV), the L1 (list 1) motion vectors (that is, the L1 motion vector part of the bi-prediction MV), and averaged motion vectors of the L0 and L1 motion vectors of the bi-prediction MVs. If the number of candidates is less than five, zero motion vector is added to the end of the list.

L0 or list 0 and L1 or list 1 refer to reference picture lists. For instance, for inter-prediction, video encoder 200 and video decoder 300 each construct one or two reference picture lists (e.g., list 0 and/or list 1). The reference picture list(s) include a plurality of reference pictures, and an index into the reference picture list or lists is used to identify the reference picture or pictures used for inter-prediction. List 0 motion vectors or list 1 motion vectors refer to motion vectors that point to a reference picture identified in list 0 or list 1, respectively. For example, video encoder 200 or video decoder 300 may determine whether a motion vector is from a reference picture list, which may mean that video encoder 200 and video decoder 300 determine whether a motion vector points to a reference picture stored in the first reference picture list (e.g., list 0) or in the second reference picture list (e.g., list 1).

Figure 7:
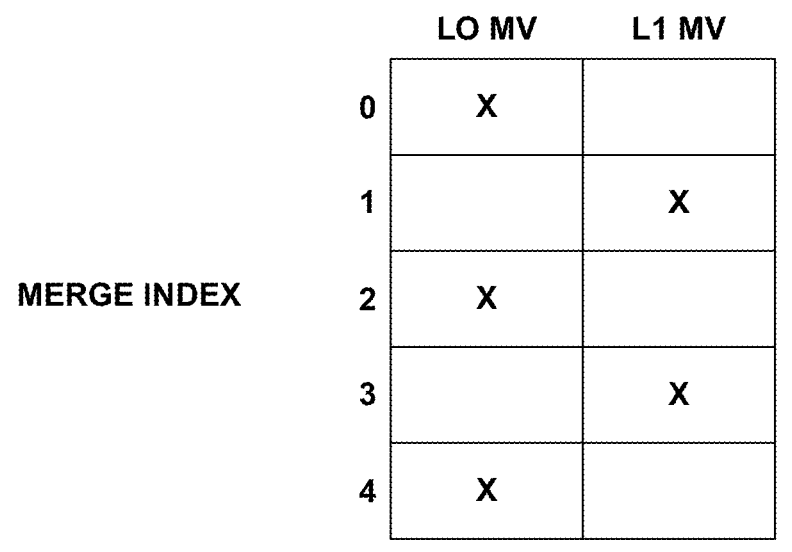

The following describes triangular prediction mode (TPM) motion inference from merge list. The following introduces TPM candidate list construction. Given a merge candidate index, the uni-prediction motion vector is derived from the merge candidate list. For a candidate in the merge list, the LX MV (with X equal to the parity of the merge candidate index value) for the candidate is used as the uni-prediction motion vector for triangle partition mode. These motion vectors are marked with "x" in FIG. 7. In case a corresponding LX motion vector does not exist, the L(1−X) motion vector of the same candidate in the extended merge prediction candidate list is used as the uni-prediction motion vector for triangle partition mode. For example, supposing the merge list is composed of 5 sets of bi-prediction motions, the TPM candidate list is composed of, from the first to the last, L0/L1/L0/L1/L0 MV of $0^{th}/1^{st}/2^{nd}/3^{rd}/4^{th}$ merge candidate. Then, the TPM mode includes signaling two different merge indices, one for each triangle partition, to indicate the use of candidates in the TPM candidate list.

The following describes blending along the triangle partition edge. After predicting each triangle partition using the triangle partition's own motion, blending is applied to the two prediction signals to derive samples around the diagonal or anti-diagonal edge. The following weights are used in the blending process: 7/8, 6/8, 5/8, 4/8, 3/8, 2/8, 1/8} for luma, as shown in FIG. 8A, and {6/8, 4/8, 2/8} for chroma, as shown in FIG. 8B.

Figures 8A, 8B:
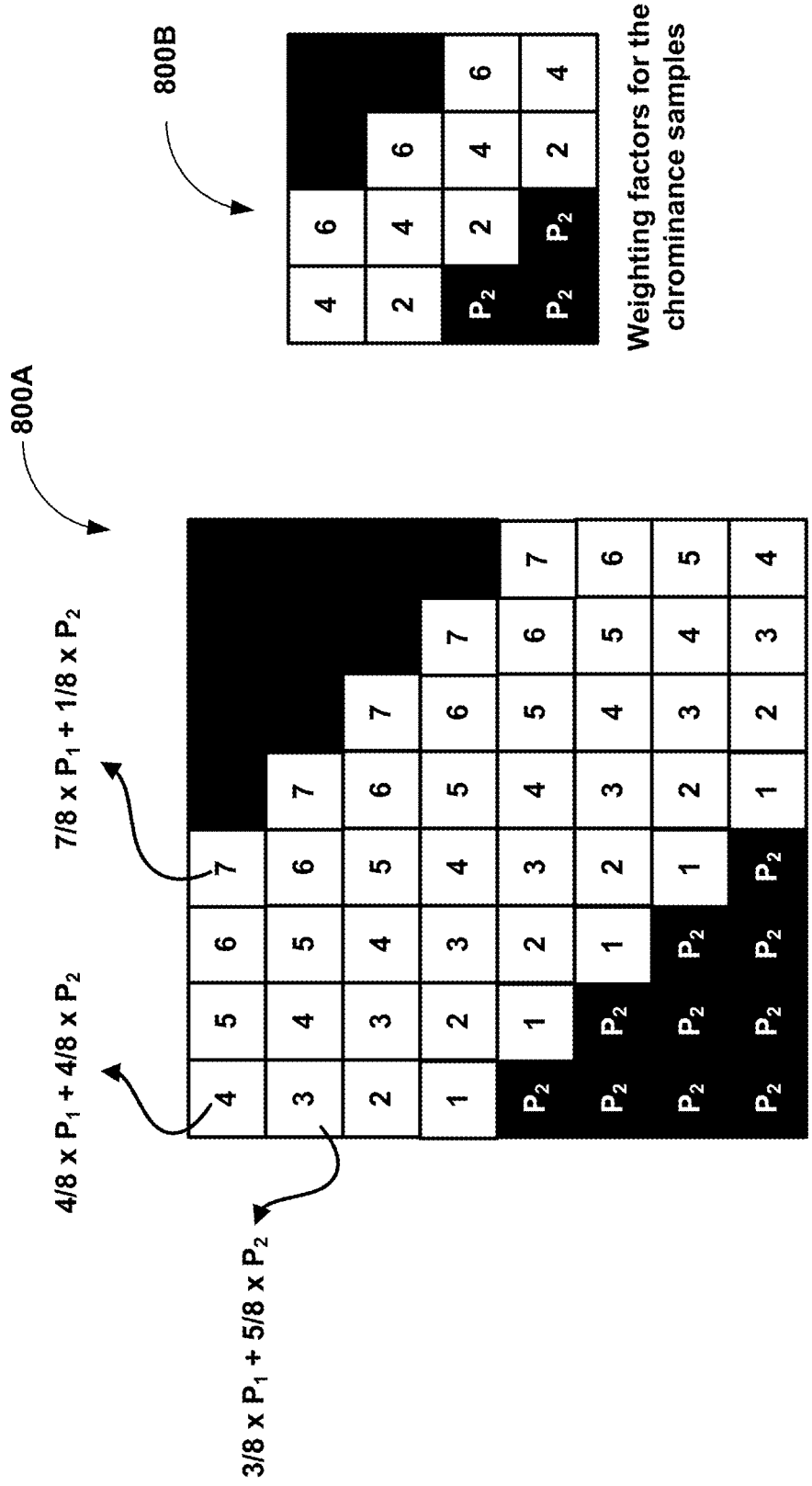
FIGS. 8A and 8B are conceptual diagrams illustrating weights used for a blending process for a luma component and a chroma component, respectively.

Stated another way, FIGS. 8A and 8B illustrate final prediction blocks for luma and chroma respectively that are generated for a current block that is partitioned with a diagonal line from the top-left corner to the bottom-right corner forming a first partition and a second partition. Video encoder 200 and video decoder 300 may determine a first prediction block based on the first motion vector and a second prediction block based on the second motion vector. Video encoder 200 and video decoder 300 may blend the first and second prediction blocks based on the weighting as illustrated in FIGS. 8A and 8B.

For example, to generate the top-left prediction sample in the final prediction block, video encoder 200 and video decoder 300 may scale the top-left prediction sample in the first prediction block by 4/8 and scale the top-left prediction sample in the second prediction block and add the result together (e.g., 4/8*P1+4/8*P2). To generate the prediction sample to the right of top-left prediction sample in the final prediction block, video encoder 200 and video decoder 300 may scale the prediction sample to the right of the top-left prediction sample in the first prediction block by 5/8 and scale the prediction sample to the right of the top-left prediction sample in the second prediction block by 3/8 and add the result together (e.g., 5/8*P1+3/8*P2). Video encoder 200 and video decoder 300 may repeat such operations to generate the final prediction block.

Some of the samples in the final prediction block may be equal to co-located samples in the first or second prediction block. For example, the top-right sample in final prediction block 800A is equal to the top-right sample in the first prediction block, which is why the top-right sample in final prediction block 800A is shown as P1. The bottom-right sample in the final prediction block 800A is equal to the bottom-right sample in the second prediction block, which is why the bottom-right sample in final prediction block 800A is shown as P2.

Accordingly, FIGS. 8A and 8B may be considered as illustrating weights indicative of an amount to scale samples in the first prediction block and an amount to scale samples in the second prediction block to generate a final prediction block for the current block. For example, a weight of 4 means that a sample in the first prediction block is scaled by 4/8 and a sample in the second prediction block is scaled by 4/8. A weight of 2 means that a sample in the first prediction block is scaled by 2/8 and a sample in the second prediction block is scaled by 6/8.

The weights illustrated in FIGS. 8A and 8B are one example. For example, for different sized blocks the weights may be different. Also, the partition line may be not be from one corner of the block to another corner of the block. For example, in GEO mode, the partition line may be at different angles. That is, the TPM mode may be considered as an example of GEO mode, where the partition line is the diagonal or the anti-diagonal of a block. However, in GEO mode, there may be other angles for the partition line, as illustrated and described in more detail below. In one or more examples, for the different angles of partition, there may be different weights. Video encoder 200 and video decoder 300 may store the weights for the different angles of partitions, and utilize the stored weights to determine an amount by which to scale samples in the first and second prediction blocks.

The following describes motion field storage. The motion vectors of a CU coded in triangle partition mode (TPM) or GEO more are stored in 4×4 units. That is, video encoder 200 and video decoder 300 may divide the current block into sub-blocks (e.g., of size 4×4) and store motion vector information for each of the sub-blocks. Depending on the position of each 4×4 sub-block, in some techniques, video encoder 200 and video decoder 300 may store either uni-prediction or bi-prediction motion vectors, denoted as Mv1 and Mv2 as uni-prediction motion vectors for partition 1 and partition 2, respectively. As described, the position of each 4×4 sub-block may determine whether uni-prediction or bi-prediction motion vector is stored. In some examples, the position of the each 4×4 sub-block may also be indicative of whether a majority of the 4×4 sub-block is in the first partition or the second partition (e.g., whether a majority of the samples of the 4×4 sub-block are in the first partition or the second partition).

Partition 1 and 2 are the triangle blocks sitting respectively on the upper-right corner and lower-left corner when CUs are partitioned from top-left to lower-right (that is 45° split), and are triangle blocks sitting respectively on the upper-left corner and lower-right corner when CUs are partitioned from top-right to lower-left (that is 135° split). That is, partition 502A is partition 1 and partition 504A is partition 2 when the partition line is 45°, as illustrated in FIG. 5A, and partition 502B is partition 1 and partition 504B is partition 2 when the partition line is 135°, as illustrated in FIG. 5B. Although the example is described with respect to triangle partitions with 45° or 135° partition lines, the techniques are not so limited. The example techniques may be applicable to examples where there are not triangle partitions, such as in various examples of the GEO mode. Even in such examples of the GEO mode, there may be a first partition (e.g., partition 1) and a second partition (e.g., partition 2).

If a 4×4 unit (e.g., sub-block) is located in the non-weighted area shown in the examples of FIGS. 8A and 8B, either Mv1 or Mv2 is stored for that 4×4 unit. For example, in FIGS. 8A and 8B, where a non-weighted sample from the first prediction block or the second prediction block is the sample in the final prediction block, video encoder 200 and video decoder 300 may select either Mv1 (e.g., first motion vector) or Mv2 (e.g., second motion vector). Otherwise, if the 4×4 unit is located in the weighted area, a bi-prediction motion vector is stored. The bi-prediction motion vector is derived from Mv1 and Mv2 according to the following process:
  a. If Mv1 and Mv2 are from different reference picture lists (one from L0 and the other from L1), then Mv1 and Mv2 are simply combined to form the bi-prediction motion vector. That is, the motion vector information for the sub-block includes both Mv1 and Mv2 (i.e., both first motion vector and second motion vector).
  b. Otherwise, if Mv1 and Mv2 are from the same list, only Mv2 is stored (i.e., only the second motion vector is stored).

Figure 9:
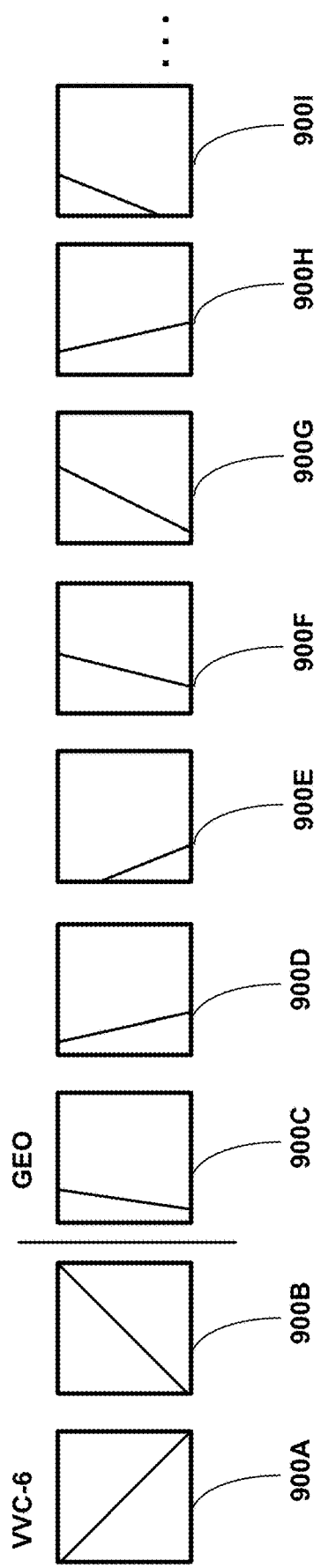
FIG. 9 is a conceptual diagram illustrating an example of a triangle partition mode (TPM) as applied to geometric partition mode (GEO).

The following describes geometric partitioning. Geometric partitioning was introduced in JVET-O0489 (Esenlik, et al. "Non-CE4: Geometrical partitioning for inter blocks" Joint Video Experts Team (WET) of ITU-T SG 16 WP 3 and ISO/IEC JTC 1/SC 29/WG 11, 15$^{th}$ Meeting: Gothenburg, SE, 3-12 Jul. 2019) as a proposed extension to the non-rectangular partitioning introduced by TPM. As introduced in JVET-O0489, the geometric partition mode (GEO) is applied only to CUs coded in skip or merge mode, but not in MMVD or CIIP mode. For a CU satisfying those conditions, a flag is signalled to indicate whether GEO is applied or not. FIG. 9 illustrates TPM in VVC-6 (VVC Draft 6) and additional shapes proposed for non-rectangular inter blocks.

For example, FIG. 9 illustrates blocks 900A and 900B that are partitioned in TPM mode. TPM mode may be considered as a subset of GEO mode. In TPM, the partition line extends from one corner to the diagonally opposite corner of the block, as shown with blocks 900A and 900B. However, in GEO mode, generally, a partition line is a diagonal, and need not necessarily start from a corner or end in a corner of the block. Blocks 900C-900I in FIG. 9 illustrate different examples of partition lines that do not necessarily start or end in a corner of blocks 900C-900I.

Figure 10:
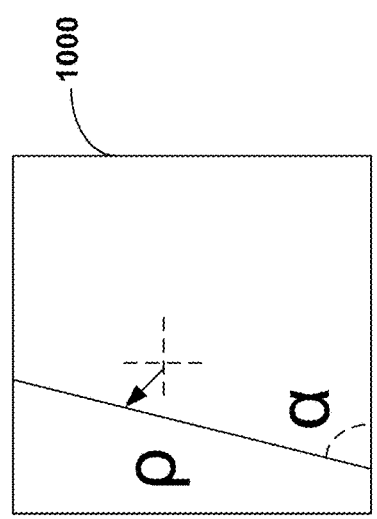
FIG. 10 is a conceptual diagram illustrating example of GEO partitioning signaling.

Overall number of GEO partitioning may be 140. For example, FIG. 9 illustrates blocks 900A-900I, but there may be 140 such possible ways to partition a block, which may be desirable for flexibility for determining how to partition but may increase signalling. There may be additional signalling (e.g., as illustrated in FIG. 10) for GEO such as the angle α, and separation line displacement relatively to the center of the block ρ. This example, α and ρ together define the location and slope of the partition line of block 1000 in FIG. 10. In some examples, α represents a quantized angle between 0 and 360 degrees, with 11.25 degrees of separation and ρ represents a distance with 5 different values (e.g., 5 displacements). The values α and ρ pairs are stored in a table of size 140×(3+5)/8=140 bytes. For example, with 11.25 degrees of separation, there may be 32 angles (e.g., 11.25*32=360). With 5 displacement values, there may be 160 modes, where one mode is a combination of one angle and one displacement (e.g., 32*5=160). It may be possible to remove certain redundant modes, like angle of 0 with displacement of 0 and angle of 180 with displacement of 0, which give the same result. By removing redundant modes, the number of modes is 140. If 3 bits are used to store the 5 displacement values and 5 bits are used to store the 32 angle values, then there is a total of 140*(3+5) bits that, upon being divided by 8 bits per byte, results in 140 bytes.

In some examples, video encoder 200 may signal an index into the table, and video decoder 300 may determine the α and ρ values. Based on the α and ρ values, video decoder 300 may determine the partition line through a block, such as block 1000 of FIG. 10.

Figure 19A:
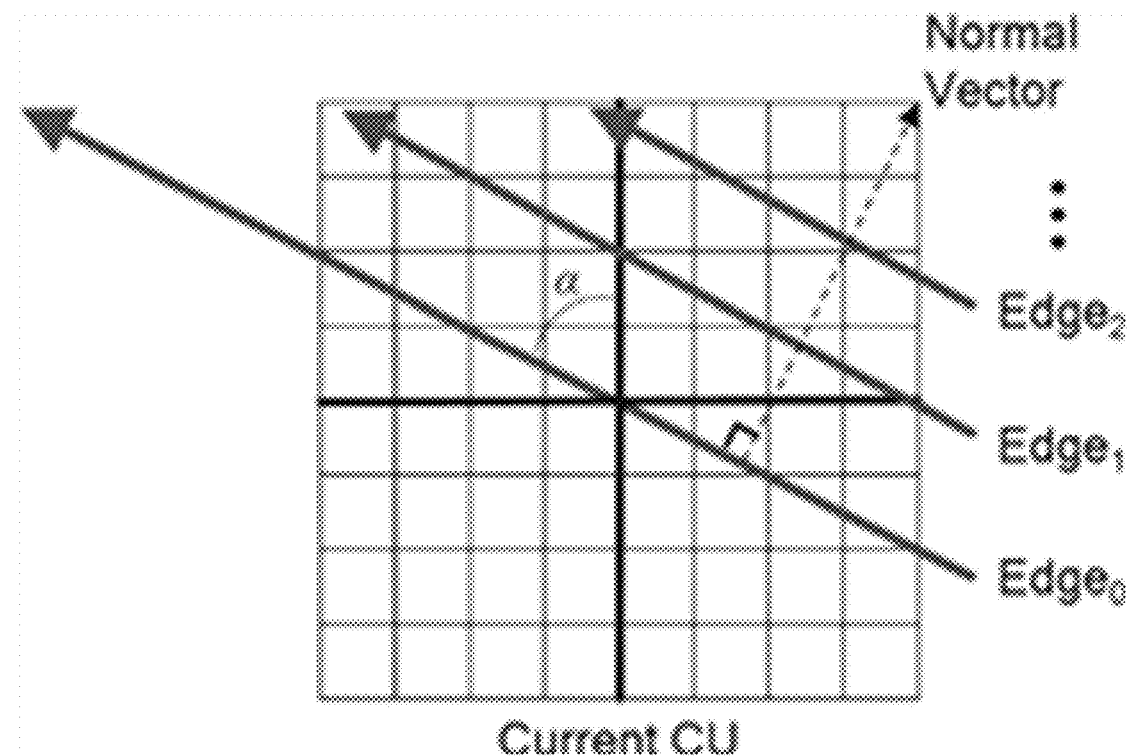
FIG. 19A is a conceptual diagram illustrating edges supported in GEO with respect to a current coding unit (CU)

Similar to TPM, GEO partitioning for inter-prediction is allowed for un-predicted blocks not smaller than 8×8 in order to have the same memory bandwidth with bi-predicted blocks at decoder side (e.g., video decoder 300). Motion vector prediction for GEO partitioning may be aligned with TPM. In the implementation of JVET-P0068, GEO supports 140 different partitioning manners, differentiated by 32 angles (quantized between 0 and 360° with 11.25° of equal separation) and 5 edges relative to the center of a CU, in addition to TPM to split a CU into two parts. FIG. 19A shows that the 5 edges are distributed uniformly along the direction of normal vector within a CU, starting from $Edge_0$ that passes through the CU center. Each partition mode (i.e., a pair of an angle index and an edge index) in GEO is assigned with a pixel-adaptive weight table to blend samples on the two partitioned parts, where the weight value of a sampled ranges from 0 to 8 and is determined by the L2 distance from the center position of a pixel to the edge. Basically, unit-gain constraint is followed when weight values are assigned, that is, when a small weight value is assigned to a GEO partition, a large complementary one is assigned to the other partition, summing up to 8.

Figure 19B:
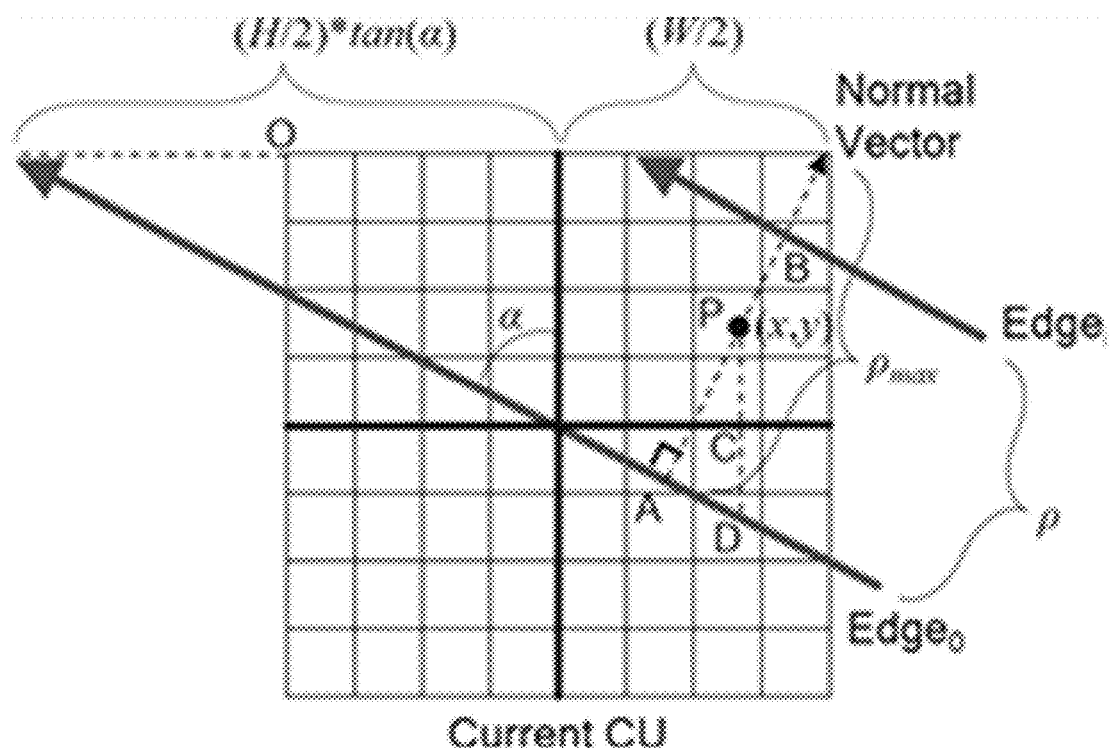
FIG. 19B is a conceptual diagram illustrating geometric relationships between a given pixel position (x,y) and two edges.

The computation of the weight value of each pixel is two-fold: (a) computing the displacement from a pixel position to a given edge and (b) mapping the computed displacement to a weight value through a pre-defined look-up table. The way to compute the displacement from a pixel position (x, y) to a given edge $Edge_i$ is actually the same as computing the displacement from (x, y) to $Edge_0$ and subtract this displacement by the distance ρ between $Edge_0$ and $Edge_i$. FIG. 19B illustrates the geometric relations among (x, y) and edges. Specifically, the displacement from (x, y) to $Edge_i$ can be formulated as follows:

$$\overline{PB} = \overline{PA} - \rho \tag{1}$$

$$= (\overline{PC} + \overline{CD}) * \sin(\alpha) - \rho \tag{2}$$

$$= \left(\left(\frac{H}{2} - y\right) + \left(x - \frac{W}{2}\right) * \cot(\alpha)\right) * \sin(\alpha) - \rho \tag{3}$$

$$= \left(x - \frac{W}{2}\right) * \cos(\alpha) - \left(y - \frac{H}{2}\right) * \sin(\alpha) - \rho \tag{4}$$

$$= x * \cos(\alpha) - y * \sin(\alpha) - \left(\rho + \frac{W}{2} * \cos(\alpha) - \frac{H}{2} * \sin(\alpha)\right) \tag{5}$$

$$= x * \cos(\alpha) + y * \cos\left(\alpha + \frac{\pi}{2}\right) - \left(\rho + \frac{W}{2} * \cos(\alpha) + \frac{H}{2} * \cos\left(\alpha + \frac{\pi}{2}\right)\right). \tag{6}$$

The value of ρ is a function of the maximum length (denoted by $\mu_{max}$) of the normal vector and edge index i, that is:

$$\rho = i * (\rho_{max} - 1)/N \tag{7}$$

$$= i * \left(\left(\frac{H}{2} * \tan(\alpha) + \frac{W}{2}\right) * \cos(\alpha) - 1\right)/N, \tag{8}$$

where N is the number of edges supported by GEO and the "1" is to prevent the last edge $Edge_{N-1}$ from falling too close to a CU corner for some angle indices.

Substituting Eq. (8) for (6) enables computation of the displacement from each pixel (x,y) to a given Edge$_i$. In short, $\overline{PB}$ can be denoted as wIdx(x,y). The computation of ρ is needed once per CU, and the computation of wIdx(x,y) is needed once per sample, in which multiplications are performed.

The following Table 1 describes mode signaling. According to the techniques described in WET-O0489, the GEO mode is signalled as an additional merge mode.

TABLE 1

Syntax elements introduced by the proposal if (cbWidth > = 8 && cbHeight >= 8 ){
    geo_flag[ x0 ][ y0 ]
}
if (geo_flag[ x0 ][ y0 ]) {
    geo_partition_idx[ x0 ][ y0 ]
    geo_merge_idx0[ x0 ][ y0 ]
    geo_merge_idx1[ x0 ][ y0 ]
}

The geo_merge_idx0 and geo_merge_idx1 are coded using the same CABAC contexts and binarization as TPM merge indices. The geo_partition_idx indicates the partition mode (out of 140 possibilities) and is coded using truncated binary binarization and bypass coding. For instance, geo_partition_idx is the index described above to determine the α and β values used to determine the partition line, as illustrated in FIG. 10.

When GEO mode is not selected, it is possible to select the TPM. The partitions of the GEO mode do not include partitions that can be obtained by TPM of binary splitting. In a way, the proposed signalling in WET-O049 scheme is similar to intra mode singalling where the TPM partitions correspond to most probable partitions and GEO modes correspond to remainder partitions. The geo_partition_idx is used as an index to the lookup table that stores the α and β pairs. As described above, 140 bytes are used to store this table.

The following describes blending operation for luma block. As in the case of TPM, the final prediction of the coding block is obtained by weighted averaging of first uni-prediction and second uni-prediction according to sample weights.

sampleWeight$_L$[x][y]=GeoFilter[distScaled] if distFromLine<=0 sampleWeight$_L$[x][y]=8−GeoFilter[distScaled] if distFromLine>0

Where sample weights are implemented as a lookup table as in Table 2 as follows:

TABLE 2

| | blending filter weights | | | | | | | | | | | | | | |
|---|---|---|---|---|---|---|---|---|---|---|---|---|---|---|---|
| distScaled | 0 | 1 | 2 | 3 | 4 | 5 | 6 | 7 | 8 | 9 | 10 | 11 | 12 | 13 | 14 |
| GeoFilter [distScaled] | 4 | 4 | 5 | 5 | 5 | 5 | 6 | 6 | 6 | 6 | 7 | 7 | 7 | 7 | 8 |

Figures 11A, 11B:
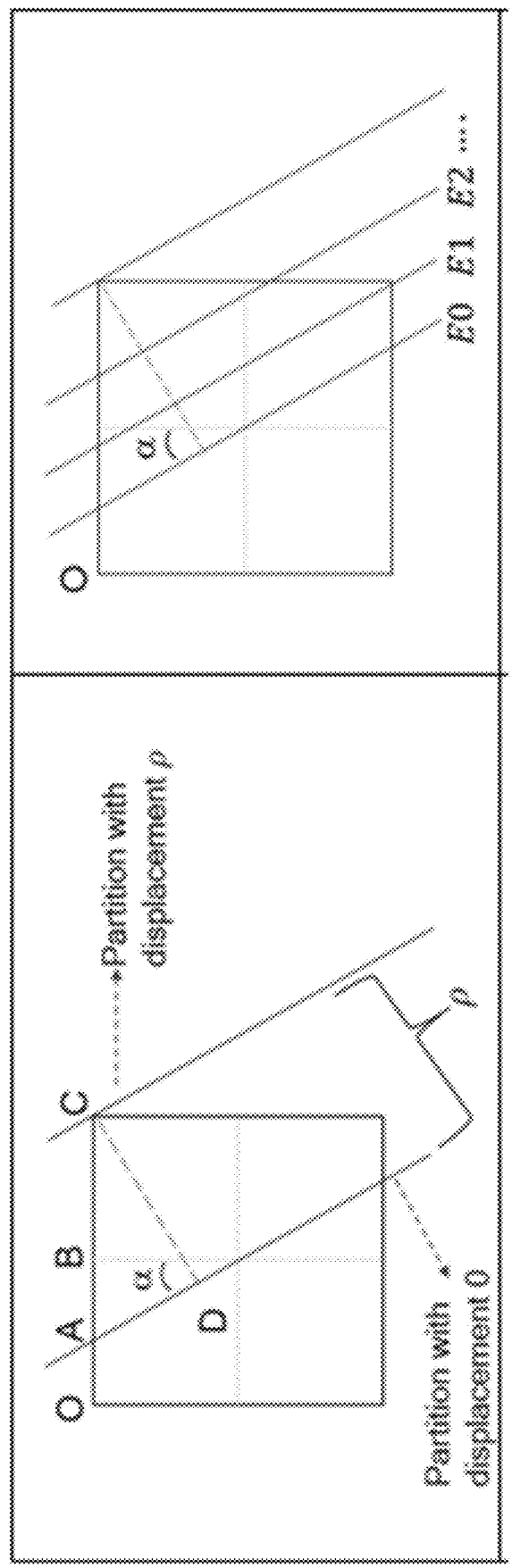
FIGS. 11A and 11B are conceptual diagrams illustrating geometry relationships among partitioning edges, displacements, and angles.

The distScaled is a quantized level of the L2 distance (or displacement) measured from a certain pixel position inside a block to the edge of geometric partitions. The process to compute this quantized level is two-fold: (a) computing the maximum displacement $\overline{CD}$ and (b) quantizing $\overline{CD}$ to several levels. As depicted in FIG. 11A, given a W×H CU and an angle α, $\overline{CD}$ can be computed as follows:

$$\overline{CD} = \overline{AC} * \sin(\alpha) \quad (1)$$

$$= ((W/2) + (H/2) * \tan(\alpha)) * \cos(\alpha) \quad (2)$$

$$= (W/2) * \cos(\alpha) + (H/2) * \sin(\alpha). \quad (3)$$

Then, before CD is quantized into levels, it is adjusted with an adjustment offset, o (e.g. 0 or 1), to prevent generating an extremely small geometric partition of certain angles and CUs, and thus the quantization step size can be computed as follows:

step size=($\overline{CD}$−o)/N, where N (e.g. 5 or 4) is the number of quantization levels. As illustrated in FIG. 11B, with a given quantization level and an angle α, the position of each edge (i.e. E0, E1, E2, . . . with quantization level 0, 1, 2, . . . , respectively) can be defined.

Figure 12:
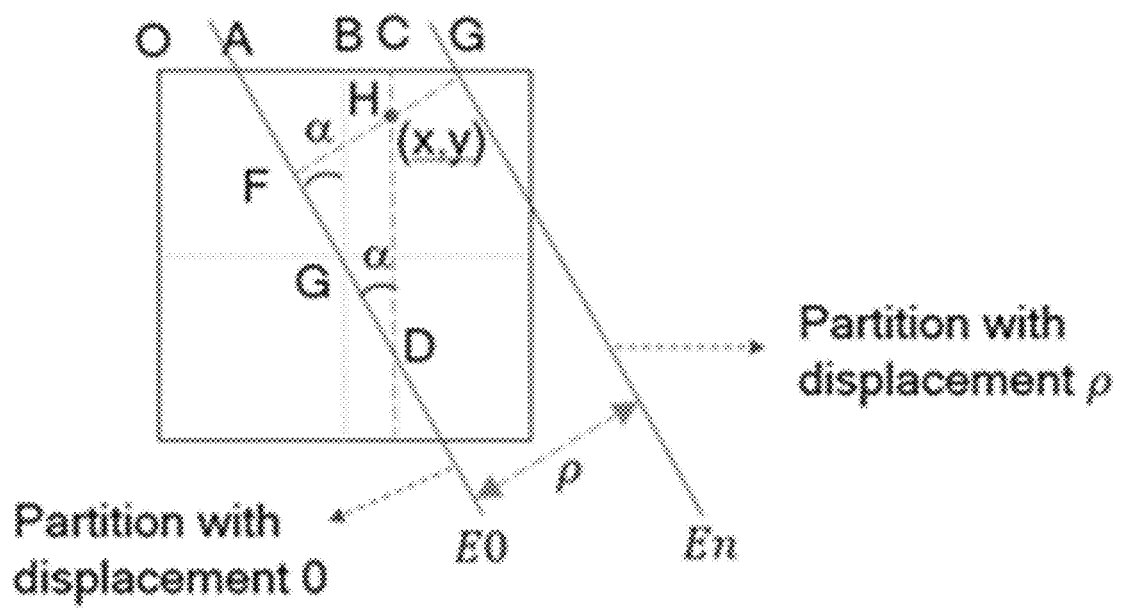
FIG. 12 is a conceptual diagram illustrating an example of projection of a point E at (x,y) onto an edge En.

Then, when given an edge, the projection distance from a random pixel inside a CU can be defined. For example, in FIG. 12, a pixel H is located at (x, y) and the given edge is En where En is an edge departing from the edge E0 with a displacement (i.e., $\overline{FG}$ or ρ in short) of n*step size. The distance (i.e., GH) from H to En can be computed as follows:

$$\overline{GH} = \overline{FH} - \overline{FG}$$

$$= \overline{DH} * \sin(\alpha) - \rho$$

$$= ((x - W/2) * \cot(\alpha) + (H/2 - y)) * \sin(\alpha) - \rho$$

$$= (x - W/2) * \cos(\alpha) + (H/2 - y) * \sin(\alpha) - \rho.$$

In the interest of floating-point number precision, the maximum distance between a pixel inside a CU to an edge is quantized (with a pre-defined step size of 5/36) into intervals with an index assigned. The absolute value of the assigned index may be distScaled.

The aforementioned process may be implemented in table loop-up fashion. The number of operations necessary for calculation of the sample weight is on the order of one addition operation per sample, which has similar computational complexity as TPM. In more detail, for each sample, distScaled is calculated according to the following two equations:

distFromLine=((x<<1)+1)*Dis[displacementX]+ ((y<<1)+1))*Dis[displacementY]−rho distScaled=min((abs(distFromLine)+8)>>4,14)

where the variable rho, displacementX and displacementY are calculated once per coding block, and Dis[ ] is a lookup table with 32 entries (8 bits resolution) that stores cosine values. distFromLine can be calculated by incrementing for each sample with a value of 2*Dis[displacementX] in a sample row and with a value of 2*Dis[displacementX] from one sample row to the next. Slightly more than 1 addition per sample may be utilized to obtain distFromLine value. Additionally, minimum, absolute value and downshift operations may be utilized, which do not introduce any considerable complexity.

All operations of GEO may be implemented using integer arithmetic. The computational complexity of GEO may be very similar to TPM. There are additional details regarding the blending operation in the draft specification modifications document, e.g., in section "8.5.7.5 Sample weight derivation process for geometric partitioning merge mode," that is provided with WET-O0489.

The following describes blending operation for chroma blocks. The sample weights calculated for the luma samples are subsampled and are used for chroma blending without any computation. The chroma sample weight at coordinate (x,y) is set equal to luma sample weight at coordinate (2x,2y), with respect to the top-left sample of luma block.

The following describes motion vector derivation. Same merge list derivation process that is used for TPM is used for deriving motion vectors of each partition of the GEO block. Each partition may be predicted only by uni-prediction.

The following describes one example technique for motion vector storage. Luma sample weights (which are calculated according to description of blending along the triangle partition edge as illustrated in FIGS. 8A and 8B), at the four corners of a 4×4 motion storage unit, are summed up. The sum is compared with two thresholds to decide whether one of two uni-prediction motion information or bi-prediction motion information is stored. The bi-prediction motion information is derived using the same process as TPM.

Stated another way, in some techniques, video encoder 200 and video decoder 300 may divide a current block into sub-blocks (e.g., 4×4 sub-blocks). For each sub-block, video encoder 200 and video decoder 300 may determine the sample weights used for scaling for the samples in the first prediction block and second prediction block. For example, referring back to FIG. 8A, there may be a 4×4 sub-block in the top-left corner of block 800A. This 4×4 sub-block includes a sample in the top-left corner, with a sample weight of 4, indicating that a sample in the first prediction block co-located with the position of the top-left sample in block 800A and a sample the second prediction block similarly co-located are scaled the same (e.g., 4/8*P1+4/8*P2, as shown in FIG. 8A). This 4×4 sub-block includes a sample in the bottom-left corner, with a sample weight of 1, indicating that a sample the first prediction block collocated with the sample in the bottom-left corner of the 4×4 sub-block is scaled by 1/8 and a sample in the second prediction block, similarly co-located, is scaled by 7/8. This 4×4 sub-block includes a sample in the top-right corner, with a sample weight of 7, indicating that a sample the first prediction block collocated with the sample in the top-right corner of the 4×4 sub-block is scaled by 7/8 and a sample in the second prediction block, similarly co-located, is scaled by 1/8, as illustrated in FIG. 8A. This 4×4 sub-block includes a sample in the bottom-right corner, with a sample weight of 4, indicating that a sample in the first prediction block collocated with the sample in the bottom-right corner of the 4×4 sub-block is scaled by 4/8 and a sample in the second prediction block, similarly co-located, is scaled by 4/8, meaning that the samples in the first prediction block and the second prediction block are scaled by the same amount.

In this example, video encoder 200 and video decoder 300 may sum the weights for the four corners of the 4×4 sub-block, which is 4+7+1+4=16. Video encoder 200 and video decoder 300 may compare the resulting value (e.g., 16) to two thresholds to determine whether video encoder 200 and video decoder 300 are to store a first motion vector that identifies the first prediction block, a second motion vector that identifies the second prediction block, or both the first and second motion vectors as the motion vector information for the 4×4 sub-block.

In accordance with the techniques, rather than or in addition to summing the luma sample weights as described above, video encoder 200 and video decoder 300 may determine a set of sub-blocks that each include at least one sample that corresponds to a prediction sample in the final prediction block that was generated based on equal weighting of a sample in the first prediction block and a sample in the second prediction block. As one example, video encoder 200 and video decoder 300 may determine a set of sub-blocks (e.g., 4×4 sub-blocks) that each include at least one sample having a weight of 4. As described above, if a sample has a weight of 4, then video encoder 200 may scale a co-located sample in the first prediction block by 4/8 (1/2) and scale a co-located sample in the second prediction block by 4/8 (1/2) to generate a prediction sample in final prediction block.

In this way, summing of weights on corners of sub-blocks and comparing to thresholds, as done in some other techniques described above, may not be needed. Rather, video encoder 200 and video decoder 300 determine whether a sub-block includes a sample for which a prediction sample in the final prediction block was generated based on equal weighting of a sample in the first prediction block and a sample in the second prediction. If a sub-block includes such a sample, video encoder 200 and video decoder 300 may store a bi-prediction motion vector, and if a sub-block does not include such a sample, video encoder 200 and video decoder 300 may store a uni-prediction motion vector.

As described above, a bi-prediction motion vector is not necessarily two motion vectors. Rather, video encoder 200 and video decoder 300 may perform certain operations to determine the bi-prediction motion vector. As one example, video encoder 200 and video decoder 300 may determine whether the first motion vector that identifies the first prediction block and the second motion vector that identifies the second prediction block are from different reference picture lists, and one of store both the first motion vector and the second motion vector for the sub-block based on the first motion vector and the second motion vector being from different reference picture lists, or select one of the first motion vector or the second motion vector based on the first motion vector and the second motion vector being from the same reference picture list, and store the selected one of the first motion vector or the second motion vector for the sub-block.

The uni-prediction motion vector may be one of the first motion vector or the second motion vector. For example, video encoder 200 and video decoder 300 may determine a sub-block that does not include any samples that correspond to prediction samples in the final prediction block that were generated based on equal weighting of samples in the first prediction block and samples in the second prediction block (e.g., the sample weight for none of the samples in the sub-block is 4). In this example, video encoder 200 and video decoder 300 may determine, for the sub-block, whether a majority of the sub-block is within the first partition or the second partition, and store, for the sub-block, the first motion vector based on the majority of the sub-block being within the first partition or the second motion vector based on the majority of the sub-block being within the second partition.

By storing motion vector information utilizing the example techniques described in this disclosure, video encoder 200 and video decoder 300 may store motion vector information that provides overall coding and visual gains. For example, the motion vector information stored for each of the sub-blocks may impact the strength of the deblock filtering. With the example techniques described in this disclosure, the motion vector information for the sub-blocks may result in determining the strength of the deblock filtering that removes artifacts. Also, the motion vector information stored for each of the sub-blocks may impact the candidate list generated for merge mode or AMVP mode for coding a subsequent block. With the example techniques described in this disclosure, the motion vector information for the sub-blocks may be better candidates for the candidate list than other techniques for generating candidates for the candidate list.

Figure 13:
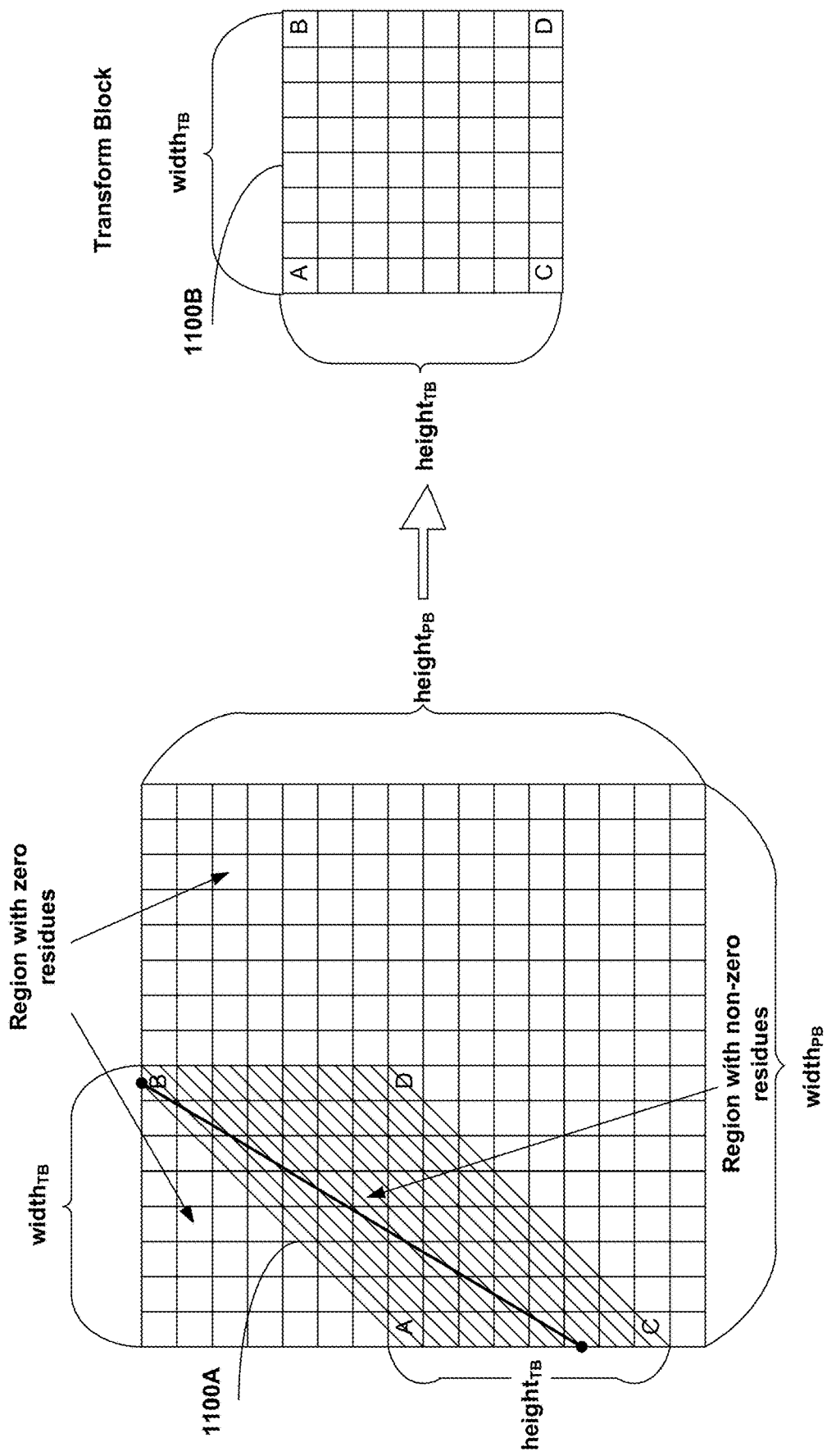
FIG. 13 is a conceptual diagram illustrating an example of partial transform for GEO predicted inter-prediction blocks.

The following describes partial transform for GEO. Since GEO partitioning provides flexibility for inter-prediction, even objects with complicated shapes may be predicted well; so the residual is smaller compared to rectangular or just triangular blocks. In some cases, non-zero residual for GEO blocks is observed only around an inner boundary, as illustrated in FIG. 13. Some techniques to reduce the residual include setting the size or W×H blocks to either W×(H/n) or (W/n)×H, keeping the non-zero residual only around the inner boundary, as illustrated by reference numeral 1100A in FIG. 13. For example, the area captured by reference numeral 1100A may be reoriented to form rectangular block 1100B, as shown in FIG. 13. With this change, residual size to be processed and number of coefficients to be signalled may become n times smaller. The value of n is signaled within the bitstream, and could be equal to 1 (when partial transform is not applied), 2 or 4. In some examples, the partial transform, an example of which is illustrated in FIG. 13, may be applied only to GEO and TPM blocks.

The following describes residual propagation for partial transform. On top of partial transform, a process acting like a form of deblocking is applied.

This deblocking operation could be described as follows:
Fetch a sample p on a block boundary that is marked by a black circle
Assign value of (p>>k) to samples at position (x, y−k) if k<=3
Fetch a sample p on a block boundary that is marked by a white circle
Assign value of (p>>k) to samples at position (x, y+k) if k<=3.

Figure 14:
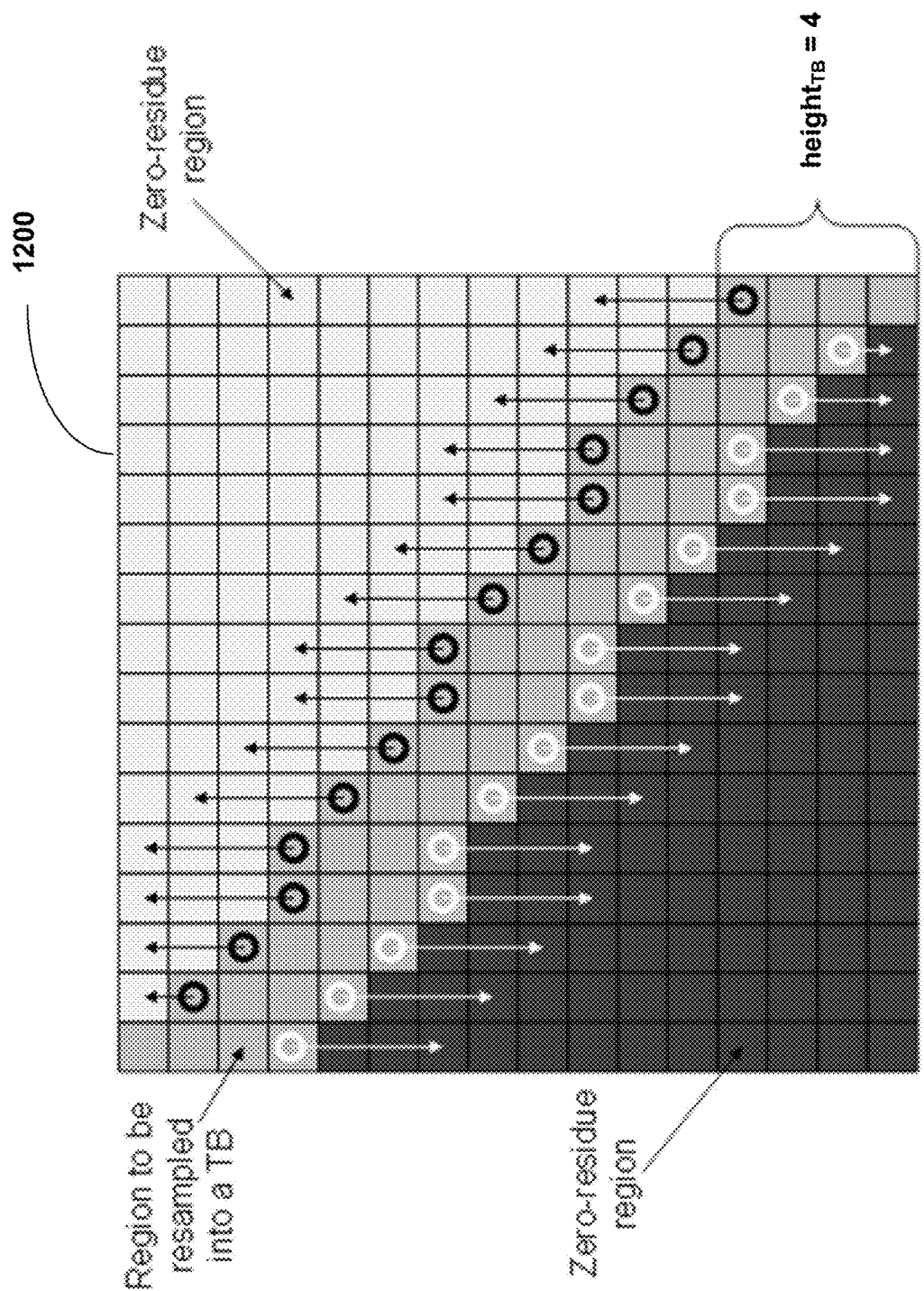
FIG. 14 is a conceptual diagram illustrating an example of a deblocking-like process of partial transform.

FIG. 14 provides examples for the value of k. The value of k is the number of samples between a boundary sample (denoted by a circle) in block 1200 and a populated sample (that is under the corresponding arrow) in block 1200. Black and white arrows show the direction of deblocking for upper and lower boundaries.

The current GEO design may be treated as an extension to TPM. However, there are some differences in the design which can be simplified for hardware implementations.

For example, for simplification of GEO distance computation, as described above with respect to blending operation for luma block, GEO performs a distance computation to choose the weight to use on each pixel. This equation is of the form $$dist = x \times \cos(\alpha) - y \times \sin(\alpha) - \rho$$
$$= \cos(\alpha) \times (x - y \times \tan(\alpha)) - \rho$$

and ρ is computed as a fraction of $\rho_{max}$, with $$\rho_{max} = \left(\frac{W}{2} + \tan(\alpha) \times \frac{H}{2}\right) \times \cos(\alpha)$$

where W and H are respectively the width and height of the block. In the description above, x and y represent the coordinates of the sample within the block, with (x, y)=(0, 0) being the top left sample This disclosure describes example techniques to change the angles used in GEO and use their properties to reduce the number of operations. For example, when using angles which have powers of two as tangent (such as the angles with width:height ratios of 1:0 1:1, 1:2, 1:4, 1:8, 1:16, 16:1, 8:1, 4:1, 2:1, 0:1), all multiplications by tangent can be replaced by shifts, which are preferable in hardware implementations.

The following describes simplification of GEO motion compensation. The current GEO needs to generate the weights used for motion compensation 'on the fly', or store 140 masks for each block size. This process is costly in operations if performed 'on the fly', or costly in memory if all masks are stored. This disclosure describes example techniques to change the weights used so that the memory requirements are reduced.

This disclosure describes example techniques that may simplify the motion field storage and the motion weight derivation of TPM and GEO.

For instance, the following describes simplification of GEO distance computation. In some examples, all GEO angles are replaced with angles such that the tangent value equal to N or 1/N, wherein N is an integer. The operations of the form a*cos(α)+b*sin(α) can be replaced by cos(α)*(a+b*tan(α))=cos(α)*(a+b*N) or $$\cos\left(\frac{\pi}{2} - \alpha\right) * (a * \cot(\alpha) + b) = \sin(\alpha) * (a * N + b).$$

In practical implementation, video encoder 200 and video decoder 300 may operate more efficiently (e.g., with fewer computations) with integer operations; however, cos(α) and sin(α) are both floating numbers and less than or equal to 1. Therefore, the two multiplications in a*cos(α)+b*sin(α) need to be both approximated by integer operations using look up table and scaling.

One possible benefit of the proposed modification is that only the multiplication with cos( ) needs to be approximated using look up table and scaling; the other multiplication is already integer (i.e., as described below with integer operation of tangent and co-tangent). In the case that M is power of 2, which is typical for the block size in video codec, the multiplication by N can be done by simply a left shift with log 2(N). The operation of a*cos(α)+b*sin(α) exists in the computation of rho (ρ) as well as the computations on the distance for MC for each pixel and the computations of distances for motion storage.

The following describes integer operation of tangent and co-tangent. When the GEO angles are all defined by the arctangent of power-of-2 numbers (i.e., $2^n$ with an integer N), the multiplication of a number and a tangent value (or cotangent value) can be implemented by solely using SHIFT operation. As a non-limiting example, without losing generality, this disclosure uses tangent as an example. When the CU width to CU height ratio is power-of-2, the tangent value of the angle inside a triangle with the same CU width and CU height is power-of-2, too. Thus, the multiplication of such tangent value and a random integer can be re-interpreted by using SHIFT operation as follows:

$$b*\tan(\alpha)=b*2^n=b<<n.$$

In certain cases when $\alpha$ is below $\pi/2$, the value of n becomes negative and right SHIFT is performed, resulting in loss of precision from $b*\tan(\alpha)$. To prevent this, video encoder 200 or video decoder 300 may add m left SHIFT bits before $b*\tan(\alpha)$ is performed. The value of m is predefined depending on the minimal value of CU width to CU height ratio. For example, the minimal one of CU width to CU height ratio in the GEO proposal of JVET-P0068 (Gao, et al. "CE4: CE4-1.1, CE4-1.2 and CE4-1.14: Geometric Merge Mode (GEO)," Joint Video Experts Team (WET) of ITU-T SG 16 WP 3 and ISO/IEC JTC 1/SC 29/WG 11, 16$^{th}$ Meeting: Geneva, CH, 1-11 Oct. 2019), is 8:64 (that is the same as 1/16 or $2^{-4}$) and thus the m can be predefined by using 4. Thus, the above equation becomes:

$$b*\tan(\alpha)*2^m=b*2^{n+m}=b<<(n+m).$$

In some examples, the $2^m$ should also be applied to all the other terms in each equation (e.g. for simplification of GEO distance compensation or $\overline{GH}$ as described above with blending operation for luma bloc) that involves multiplications with tangent or cotangent. For example, $\cos(\alpha)*(a+b*\tan(\alpha))$ becomes $(\cos(\alpha)*((a<<m)+(b<<(n+m)))+off)>>m$, where off is a pre-defined rounding offset which can be any integer value (e.g., $2^{m-1}$).

In another example, to secure the precision of $b*\tan(\alpha)$, video encoder 200 and video decoder 300 need not increase its precision by multiplying itself with a power-of-2 number. The equation $b*\tan(\alpha)$ can be represented in a general form as $b*\tan(\alpha)*M$, where M is a positive integer number. Thus, for the equations with $b*\tan(\alpha)$ can be re-interpreted by using integer multiplication and division. For example, $\cos(\alpha)*(a+b*\tan(\alpha))$ becomes $(\cos(\alpha)*(a*M+(b*M)<<n))+off)/M$. This division can be approximated by using a multiplication and a right SHIFT. For example, when M=10, X/M can be approximated by using $(X*205)>>11$, where X is an integer.

The following describes simplification of GEO motion compensation. Using the property $$\cos(\alpha)*(x-y*\tan(\alpha))-rho =$$
$$\cos(\alpha)*((x+\tan(\alpha))-(y+1)*\tan(\alpha))-rho$$
$$rho = \left(\rho + \frac{W}{2}*\cos(\alpha) + \frac{H}{2}*\sin(\alpha)\right),$$

it can be seen that the row y+1 will have the same weights as the row y, but offset by $\tan(\alpha)$.

When $\tan(\alpha)=N$, the values of weights for MC on row y+1 may be the same as the values on row y, but shifted by N samples, and using 8s and 0s as beginning and trailing values. For example, FIG. 15 illustrates an example of weights of GEO using the angle with ratio 2:1. The bolded, italicized part shows the pattern that is shifted by $\tan(\alpha)=2$ pixels for each row. When $\tan(\alpha)=1/N$, the values of weights for MC on column x+1 may be the same as the values on column x but shifted by N samples.

In some examples, this property (e.g., when $\tan(\alpha)=1/N$, the values of weights for MC on column x+1 may be the same as the values on column x but shifted by N samples) is used by storing the weights of one row (resp. column) for each block size and each partition. In some examples, instead of storing the weights for each possible GEO partition and weights, only the weights from one row (or column), consisting of at least one beginning value "8" and at least one trailing value "0", of each angle are stored and used for each block size and displacement index. Using the starting point of the split line, the weights can then be applied on the first row (resp column) and shifted on each following row (resp column).

In some examples, the offset between rows is determined based on $\tan(\alpha)$. When the absolution (e.g., absolute) value of $\tan(\alpha)$ is at least 1, the weights between two adjacent rows are exactly the same, except that the weights in the second row is shifted by n pixels, where n is equal to $\tan(\alpha)$. When the absolute value of $\tan(\alpha)$ is less than 1, the weights are exactly the same every $|1/\tan(\alpha)|$ rows, except that the weights are shifted by 1 pixel every $|1/\tan(\alpha)|$ rows if $\tan(\alpha)\geq 1$ or shifted by $-1$ pixel every $|1/\tan(\alpha)|$ rows if $\tan(\alpha)<1$.

In some examples, the offset between columns is determined based on $\cot(\alpha)$. When the absolution (e.g., absolute) value of $\cot(\alpha)$ is at least 1, the weights between two adjacent columns are exactly the same, except that the weights in the second column is shifted by n pixels, where n is equal to $\cot(\alpha)$. When the absolute value of $\cot(\alpha)$ is less than 1, the weights are exactly the same every $|1/\cot(\alpha)|$ columns, except that the weights are shifted by 1 pixel every $|1/\cot(\alpha)|$ columns if $\cot(\alpha)\geq 1$ or shifted by $-1$ pixel every $|1/\cot(\alpha)|$ columns if $\cot(\alpha)<1$.

The following describes simplification of displacement. The displacement definition may be changed as follows: if the tangent of angle r is larger than or equal to 1, the weight at location (x, y) for the partition with angle r and displacement d is equal to the weight at location (x+d, y), otherwise if the tangent of angle r is less than 1, the weight at location (x, y) for the partition with angle r and displacement d is equal to the weight at location (x, y+d). By such definition of displacement, different partitions with the same angle can share the same mask of weights, with only an offset of d in x coordinate or y coordinate. Therefore, the storage of the weight masks can be reduced.

In one example, the step of d is fixed to a predefined value that may be dependent on the selected angle. In one example, the step of d is determined by $\rho/\cos(\alpha)$ and rounded to an integer. Scaling may be applied before rounding. The displacements can be precalculated and stored in a 2D look up table. In some cases, one value of displacement is defined for each angle and each displacement index.

The following describes simplification on number of partitions. In some examples, the number of partitions available for GEO may be changed, as 140 different partitions may be too many and impact computational efficiency. In some examples, the angle removed can be as in FIG. 16. FIG. 16 is a table illustrating example angles to remove for reduced number of partitions, with the removed angles shown with strikethrough.

In some examples, to further reduce the number of partitions, not all displacements are available. For all angles, only 4 distances can be kept, instead of 5 in the original GEO design. For 0° and 90° angles, only displacement indexes 1 and 2 can be kept.

Figure 17:
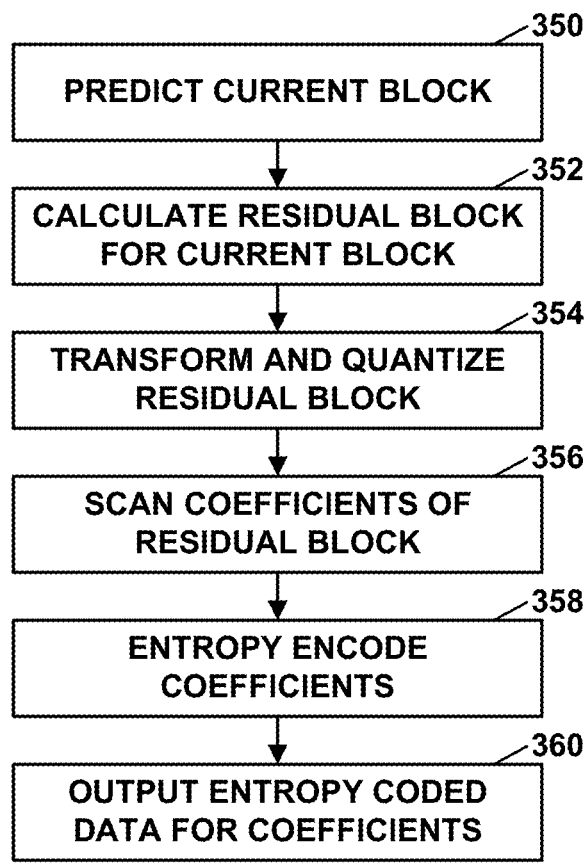
FIG. 17 is a flowchart illustrating an example method for encoding a current block of video data.

FIG. 17 is a flowchart illustrating an example method for encoding a current block. The current block may comprise a current CU. Although described with respect to video encoder 200 (FIGS. 1 and 3), it should be understood that other devices may be configured to perform a method similar to that of FIG. 17.

In this example, video encoder 200 initially predicts the current block (350). For example, video encoder 200 may form a prediction block for the current block. Video encoder 200 may then calculate a residual block for the current block (352). To calculate the residual block, video encoder 200 may calculate a difference between the original, unencoded block and the prediction block for the current block. Video encoder 200 may then transform and quantize coefficients of the residual block (354). Next, video encoder 200 may scan the quantized transform coefficients of the residual block (356). During the scan, or following the scan, video encoder 200 may entropy encode the transform coefficients (358). For example, video encoder 200 may encode the transform coefficients using CAVLC or CABAC. Video encoder 200 may then output the entropy encoded data of the block (360).

Figure 18:
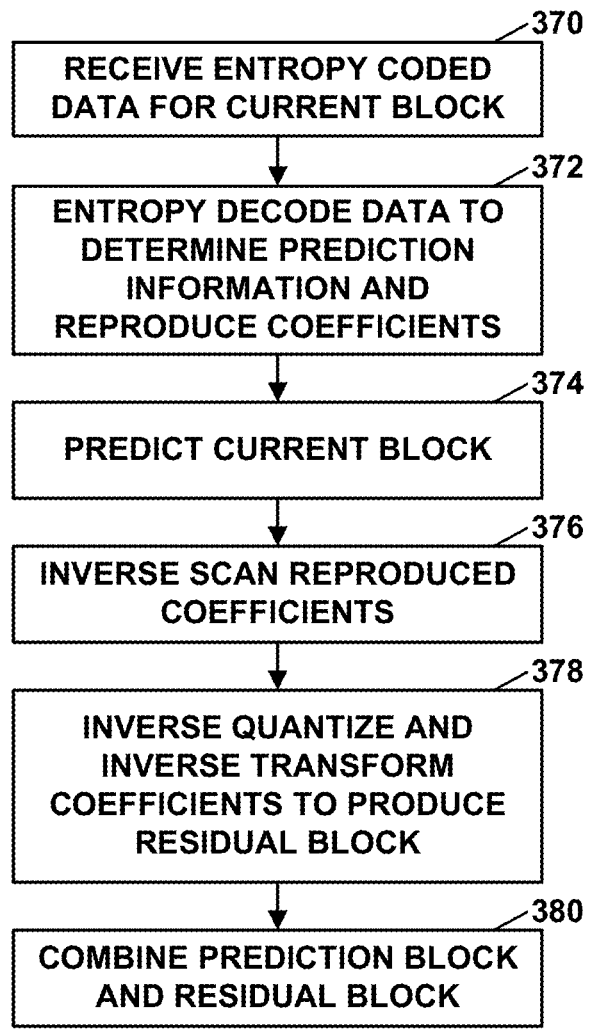
FIG. 18 is a flowchart illustrating an example method for decoding a current block of video data.

FIG. 18 is a flowchart illustrating an example method for decoding a current block of video data. The current block may comprise a current CU. Although described with respect to video decoder 300 (FIGS. 1 and 4), it should be understood that other devices may be configured to perform a method similar to that of FIG. 18.

Video decoder 300 may receive entropy encode data for the current block, such as entropy encoded prediction information and entropy encoded data for coefficients of a residual block corresponding to the current block (370). Video decoder 300 may entropy decode the entropy encoded data to determine prediction information for the current block and to reproduce coefficients of the residual block (372). Video decoder 300 may predict the current block (374), e.g., using an intra- or inter-prediction mode as indicated by the prediction information for the current block, to calculate a prediction block for the current block. Video decoder 300 may then inverse scan the reproduced coefficients (376), to create a block of quantized transform coefficients. Video decoder 300 may then inverse quantize and inverse transform the transform coefficients to produce a residual block (378). Video decoder 300 may ultimately decode the current block by combining the prediction block and the residual block (380).

Some embodiments are directed to applying GEO using angles having a power of 2 as tangent. In some such embodiments, the angles used by GEO in JVET-P0068 are replaced with angles having powers of 2 as tangent.

Figure 20:
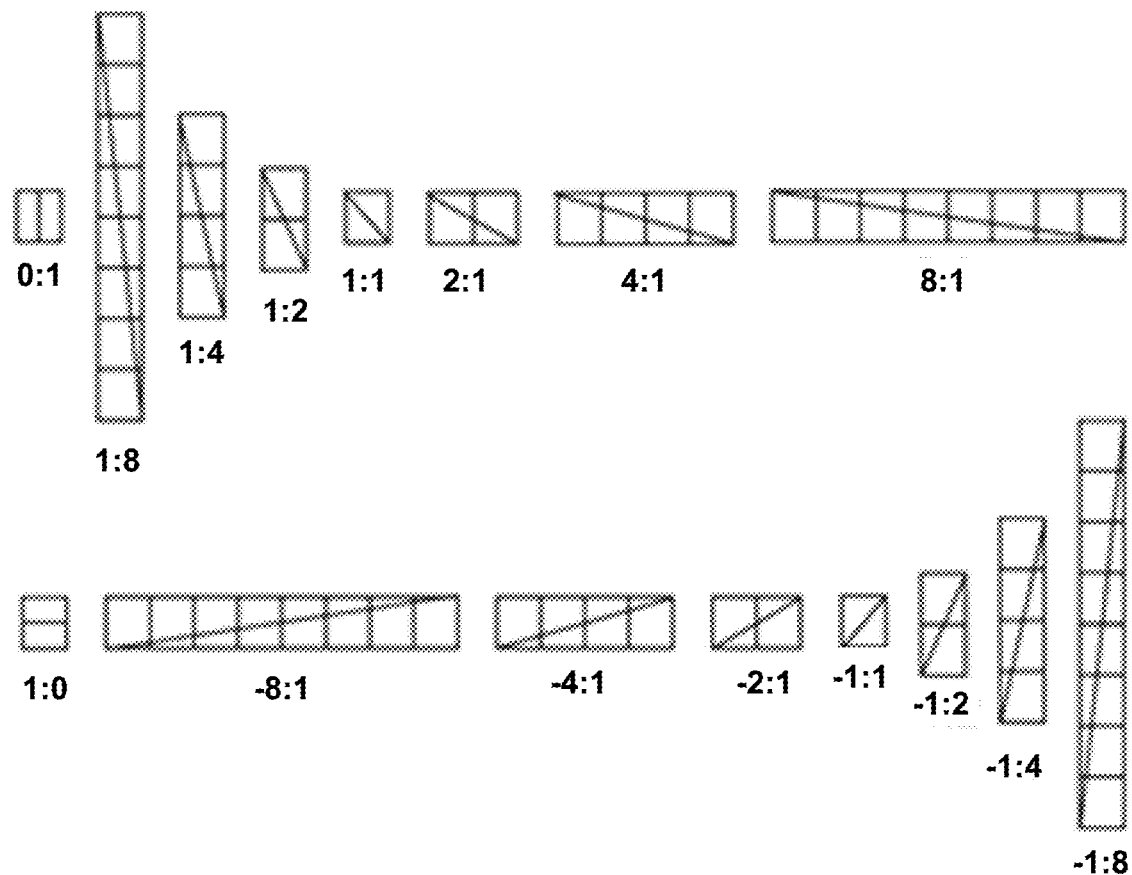
FIG. 20 is a conceptual diagram illustrating example angles for GEO along with their corresponding width:height ratio according to one embodiment.

FIG. 20 is a conceptual diagram illustrating examples of angles for GEO along with the corresponding width:height ratio. In this specific example, there are 16 different angles, times 2 as each angle can be used with +180°, which means that the number of allowed GEO partitions is still 140, and no change is made to the signalling of GEO. Because the tangent of the example angles is a power-of-2 number, most of the multiplications required in Eq. (6) for wIdx(x,y) can be replaced by using bit-shifting:

$$wIdx(x, y) = \qquad (9)$$
$$x*\cos(\alpha) + y*\cos\left(\alpha + \frac{\pi}{2}\right) - \left(\rho + \frac{W}{2}*\cos(\alpha) + \frac{H}{2}*\cos\left(\alpha + \frac{\pi}{2}\right)\right)$$

$$= x*\cos(\alpha) - y*\sin(\alpha) - \left(\rho + \frac{W}{2}*\cos(\alpha) - \frac{H}{2}*\sin(\alpha)\right) \qquad (10)$$

$$= \left(x - \frac{W}{2}\right)*\cos(\alpha) - \left(y - \frac{H}{2}\right)*\sin(\alpha) - \rho \qquad (11)$$

$$= \cos(\alpha)*\left(\left(x - \frac{W}{2}\right) - \left(y - \frac{H}{2}\right)*\tan(\alpha)\right) - \rho. \qquad (12)$$

Using those angles that having powers of 2 as tangent, one multiplication per sample can be replaced with bit-shifting operations in implementations where GEO weight values are computed 'on the fly'. As triangle functions may be implemented as integer-precision operation, reduction of one multiplication helps reduce rounding error.

In some implementations, the coding device (encoder and/or decoder) may store masks with the weights for each CU size and each partition to reduce the number of operations needed by GEO, because weight values repeat row-by-row with phase shift. This behavior can be formulated by using Eq. (12), as follows:

$$wIdx(x, y) = \qquad (13)$$
$$\cos(\alpha)*\left(\left(x - \frac{W}{2}\right) - \left(y - \frac{H}{2}\right)*\tan(\alpha)\right) - \rho + \cos(\alpha)*(\tan(\alpha) - \tan(\alpha))$$

$$= \cos(\alpha)*\left(\left(x - \tan(\alpha) - \frac{W}{2}\right) - \left(y - 1 - \frac{H}{2}\right)*\tan(\alpha)\right) - \rho \qquad (14)$$

$$= wIdx(x - \tan(\alpha), y - 1). \qquad (15)$$

As can be seen, wIdx(x,y) can be interpreted as inferring one of the weight value assigned to immediately previous row, and thus one row of weight values is the only item required for mask storage.

In some cases, the value of tan(α) may not be integer, cot(α) is used as replacement and thus the weight values repeat column-by-column with phase shift as in Eq. (18). As can be seen, wIdx(x,y) can be interpreted as inferring one of the weight value assigned to immediately left row, and thus one column of weight values is the only item required for mask storage.

$$wIdx(x, y) = \qquad (16)$$
$$\cos(\alpha)*\left(\left(x - \frac{W}{2}\right) - \left(y - \frac{H}{2}\right)*\tan(\alpha)\right) - \rho + \cos(\alpha)*(1 - 1)$$

$$= \cos(\alpha)*\left(\left(x - 1 - \frac{W}{2}\right) - \left(y - \cot(\alpha) - \frac{H}{2}\right)*\tan(\alpha)\right) - \rho \qquad (17)$$

$$= wIdx(x - 1, y - \cot(\alpha)). \qquad (18)$$

Within 0 to π/2, there are 4 angles which will produce a power-of-2 number for cot(α), the equations in (15) and (18) thus can be harmonized by using 4-bit shifting as follows:

$$wIdx(x, y) = \qquad (19)$$
$$\left(\cos(\alpha)*\left(\left(\left(x - \frac{W}{2}\right) \ll 4\right) - \left(y - \frac{H}{2}\right)*(\tan(\alpha) \ll 4)\right) - (\rho \ll 4) + 2^{4-1}\right) \gg 4.$$

In JVET-P0068, by contrast, most of the angles have non-integer values for tan(α), meaning that (x−tan(α), y−1) and (x−1, y−cot(α)) does not fall on the center of a pixel, and this property cannot be used.

Some examples may include modification of p. To ensure weight values are invariant to edge index, the horizontal or vertical distance between 2 edges has to be exactly an integer number of samples (i.e., 1, 2, 3 and so on). To achieve this, the definition of step size (i.e., ($\overline{CD}$-o)/N) as specified above may be changed. Instead of quantizing directly on $\overline{CD}$, this embodiment includes performing quantization on $\overline{AC}$ and projects the computed step size from $\overline{AC}$ onto $\overline{CD}$. Specifically, this process can be formulated as:

step size=floor(($\overline{AC}$-ε)/N+o)*cos(α), where ε is an adjustment offset to prevent generating an extremely small geometric partition by certain angles and to avoid zero step size and o is a rounding offset. Then, the value of ρ can be computed by i*step size, where is the edge index.

Some further examples include applying GEO weight calculation to TPM. For example, the TPM weight values may be computed in the same way as GEO does. GEO shares exactly the same angles as those of TPM, but GEO and TPM have a different method to compute their respective weight tables. The present example harmonizes the TPM weight calculation by using the same derivation method as for GEO.

In syntax representation, for certain pairs of CU size and angle, GEO can produce exactly the same prediction as TPM does. Such syntax overhead is removed: that is, GEO does not support edges sitting on diagonal directions (i.e., the edge connected by two opposite corners inside a CU).

Figure 21:
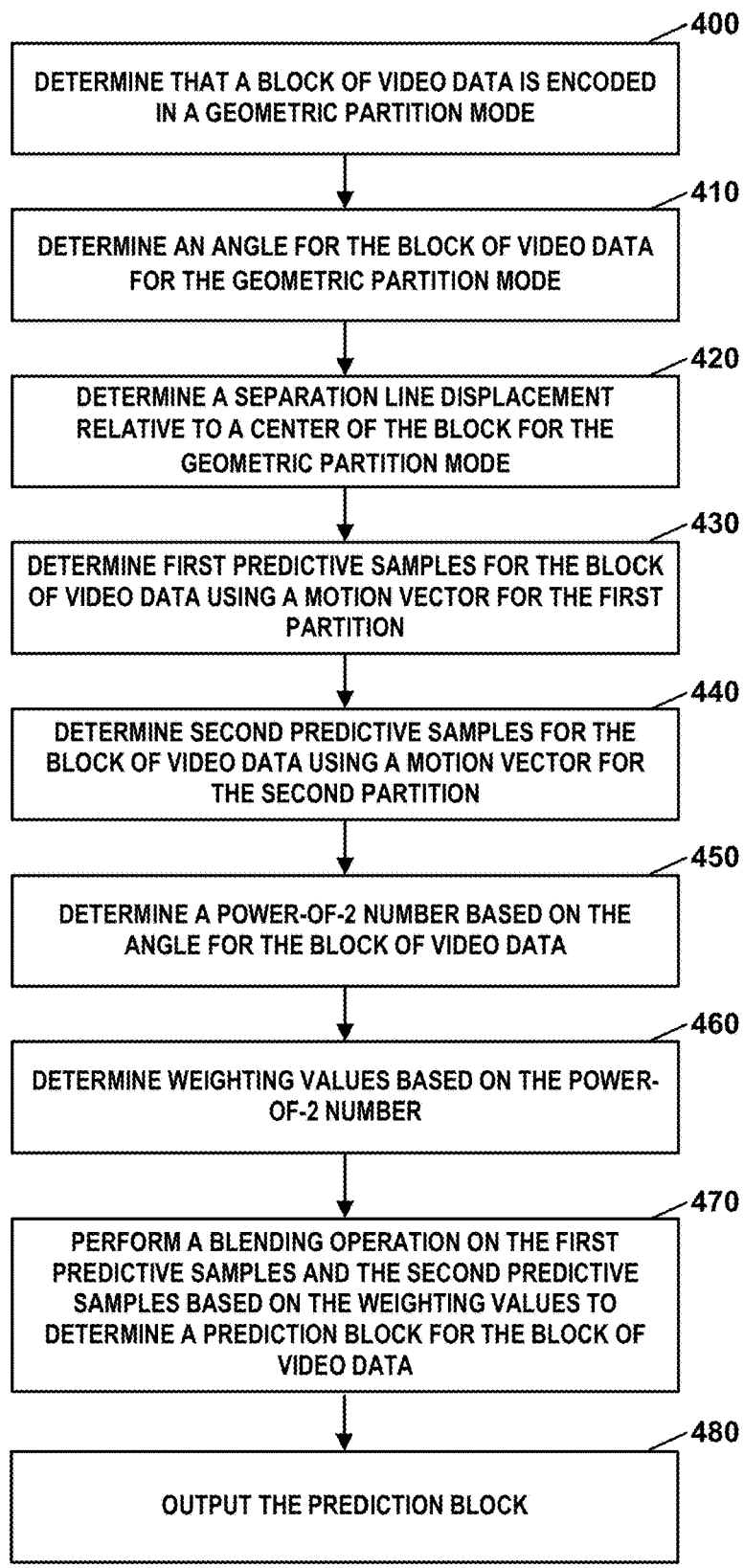
FIG. 21 is a flow diagram illustrating an example operation of decoding video data, in accordance with one or more techniques of this disclosure.

FIG. 21 is a flow diagram illustrating an example operation of decoding video data, in accordance with one or more techniques of this disclosure. The techniques of FIG. 21 will be described with reference to a generic video decoder, which may, for example, correspond to video decoder 300. The techniques of FIG. 21 may also be performed by the decoding loop of video encoder 200 as part of a video encoding process. As seen in the example of FIG. 21, the video decoder may initially determine that a block of video data is encoded in a geometric partition mode (400). The video decoder may determine an angle for the block of video data for the geometric partition mode (410). To determine the angle for the block of the video data for the geometric partition mode, the video decoder may, for example, determine the angle from a set of available angles that consists only of angles that have tangent values equal to $2^n$, wherein n is an integer value representing the power-of-2.

Next, the video decoder may determine a separation line displacement relative to a center of the block for the geometric partition mode (420). Next, the video decoder may determine first predictive samples for the block of video data using a motion vector for the first partition (430). The video decoder may determine second predictive samples for the block of video data using a motion vector for the second partition (440).

Next, the video decoder may determine a power-of-2 number based on the angle for the block of video data (450). The power-of-2 number represent a number equal to $2^n$, with n representing an integer value. The integer value may, for example, be between −4 and 4, although other integer values may also be used. The power-of-2 number generally corresponds to a tangent of the angle, or an approximation thereof.

Next, the video decoder may determine weighting values based on the power-of-2 number 460). To determine the weighting values based on the power-of-2 number, the video decoder may apply a shift operation based on the power-of-2. To determine the weighting values based on the power-of-2 number, video decoder 300 may be configured to apply a shift operation based on the power-of-2 to determine a distance value and determine the weighting values based on the distance value. To determine the weighting values based on the distance value, the video decoder may be configured to determine the weighting values from a look-up table.

Next, the video decoder may perform a blending operation on the first predictive samples and the second predictive samples based on the weighting values to determine a prediction block for the block of video data (470). To perform the blending operation on the first predictive samples and the second predictive samples to determine the prediction block for the block of the video data, the video decoder may be configured to determine a weighted average of a sample of the first predictive samples and a sample of the second predictive samples to determine a sample value for the sample of the prediction block, with the weighting values corresponding to weights for determining the weighted average The video decoder may output the prediction block (480). The video decoder may, for example, determine residual data indicative of difference between the prediction block and the block of the video data and reconstruct the block of the video data by adding the prediction block and the residual data.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

The following examples are examples of the techniques and devices described above.

Example 1

A method of coding video data, the method comprising coding a current picture using geometric partition mode in accordance with any one or combination of techniques described in this disclosure.

Example 2

The method of example 1, wherein the coding comprises decoding.

Example 3

The method of example 1, wherein the coding comprises encoding.

Example 4

A device for coding video data, the device comprising: memory configured to store video data; and processing circuitry configured to code a current picture using geometric partition mode in accordance with any one or combination of techniques described in this disclosure.

Example 5

The device of example 4, further comprising a display configured to display decoded video data.

Example 6

The device of any of examples 4 and 5, wherein the device comprises one or more of a camera, a computer, a mobile device, a broadcast receiver device, or a set-top box.

Example 7

The device of any of examples 4-6, wherein the device comprises a video decoder.

Example 8

The device of any of examples 5-6, wherein the device comprises a video encoder.

Example 9

A computer-readable storage medium having stored thereon instructions that, when executed, cause one or more processors to code a current picture using geometric partition mode in accordance with any one or combination of techniques described in this disclosure.

Example 10

A device for coding video data, the device comprising means for coding a current picture using geometric partition mode in accordance with any one or combination of techniques described in this disclosure.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable gate arrays (FPGAs), or other equivalent integrated or discrete logic circuitry. Accordingly, the terms "processor" and "processing circuitry," as used herein may refer to any of the foregoing structures or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of decoding video data, the method comprising:
    determining that a block of the video data is encoded in a geometric partition mode;
    determining an angle for the block of the video data for the geometric partition mode;
    determining a separation line displacement relative to a center of the block for the geometric partition mode;
    partitioning the block into a first partition and a second partition based on the angle and the separation line displacement;
    determining first predictive samples for the block of the video data using a motion vector for the first partition;
    determining second predictive samples for the block of the video data using a motion vector for the second partition;
    determining a power-of-2 number based on the angle for the block of the video data;
    determining weighting values based on the power-of-2 number;
    performing a blending operation on the first predictive samples and the second predictive samples based on the weighting values to determine a prediction block for the block of the video data; and
    outputting the prediction block.

2. The method of claim 1, wherein the power-of-2 number is equal to $2^n$, wherein n represents an integer value.

3. The method of claim 2, wherein n represents an integer value between −4 and 4.

4. The method of claim 1, wherein the power-of-2 number comprises a tangent of the angle.

5. The method of claim 1, wherein determining the angle for the block of the video data for the geometric partition mode comprises determining the angle from a set of available angles, wherein the set of available angles consists only of angles that have tangent values equal to $2^n$, wherein n represents an integer value.

6. The method of claim 1, wherein determining the weighting values based on the power-of-2 number comprises applying a shift operation based on the power-of-2.

7. The method of claim 1, wherein determining the weighting values based on the power-of-2 number comprises:
applying a shift operation based on the power-of-2 to determine a distance value; and
determining the weighting values based on the distance value.

8. The method of claim 7, wherein determining the weighting values based on the distance value comprises determining the weighting values from a look-up table.

9. The method of claim 1, wherein performing the blending operation on the first predictive samples and the second predictive samples to determine the prediction block for the block of the video data comprises determining a weighted average of a sample of the first predictive samples and a sample of the second predictive samples to determine a sample value for the sample of the prediction block, wherein the weighting values comprise weights for determining the weighted average.

10. The method of claim 1, further comprising:
receiving residual data indicative of difference between the prediction block and the block of the video data; and
reconstructing the block of the video data by adding the prediction block and the residual data.

11. The method of claim 1, wherein the method of encoding is performed as part of a video encoding process.

12. A device for decoding video data, the device comprising:
a memory configured to store video data;
one or more processors implemented in circuitry and configured to:
determine that a block of the video data is encoded in a geometric partition mode;
determine an angle for the block of the video data for the geometric partition mode;
determine a separation line displacement relative to a center of the block for the geometric partition mode;
partition the block into a first partition and a second partition based on the angle and the separation line displacement;
determine first predictive samples for the block of the video data using a motion vector for the first partition;
determine second predictive samples for the block of the video data using a motion vector for the second partition;
determine a power-of-2 number based on the angle for the block of the video data;
determine weighting values based on the power-of-2 number;
perform a blending operation on the first predictive samples and the second predictive samples based on the weighting values to determine a prediction block for the block of the video data; and
output the prediction block.

13. The device of claim 12, wherein the power-of-2 number is equal to $2^n$, wherein n represents an integer value.

14. The device of claim 13, wherein n represents an integer value between −4 and 4.

15. The device of claim 12, wherein the power-of-2 number comprises a tangent of the angle.

16. The device of claim 12, wherein to determine the angle for the block of the video data for the geometric partition mode, the one or more processors are further configured to determine the angle from a set of available angles, wherein the set of available angles consists only of angles that have tangent values equal to $2^n$, wherein n represents an integer value.

17. The device of claim 12, wherein to determine the weighting values based on the power-of-2 number, the one or more processors are further configured to apply a shift operation based on the power-of-2.

18. The device of claim 12, wherein to determine the weighting values based on the power-of-2 number, the one or more processors are further configured to:
apply a shift operation based on the power-of-2 to determine a distance value; and
determine the weighting values based on the distance value.

19. The device of claim 18, wherein to determine the weighting values based on the distance value, the one or more processors are further configured to determine the weighting values from a look-up table.

20. The device of claim 12, wherein to perform the blending operation on the first predictive samples and the second predictive samples to determine the prediction block for the block of the video data, the one or more processors are further configured to determine a weighted average of a sample of the first predictive samples and a sample of the second predictive samples to determine a sample value for the sample of the prediction block, wherein the weighting values comprise weights for determining the weighted average.

21. The device of claim 12, wherein the one or more processors are further configured to:
receive residual data indicative of difference between the prediction block and the block of the video data; and
reconstruct the block of the video data by adding the prediction block and the residual data.

22. The device of claim 12, wherein the device is configured to output the prediction block as part of a video encoding process.

23. The device of claim 12, wherein the device comprises a wireless communication device, further comprising a receiver configured to receive encoded video data.

24. The device of claim 23, wherein the wireless communication device comprises a telephone handset and wherein the receiver is configured to demodulate, according to a wireless communication standard, a signal comprising the encoded video data.

25. The device of claim 12, further comprising:
a display configured to display decoded video data determined from the prediction block.

26. The device of claim 12, wherein the device comprises one or more of a camera, a computer, a mobile device, a broadcast receiver device, or a set-top box.

27. An apparatus for decoding video data, the apparatus comprising:
means for determining that a block of the video data is encoded in a geometric partition mode;
means for determining an angle for the block of the video data for the geometric partition mode;

means for determining a separation line displacement relative to a center of the block for the geometric partition mode;
means for partitioning the block into a first partition and a second partition based on the angle and the separation line displacement;
means for determining first predictive samples for the block of the video data using a motion vector for the first partition;
means for determining second predictive samples for the block of the video data using a motion vector for the second partition;
means for determining a power-of-2 number based on the angle for the block of the video data;
means for determining weighting values based on the power-of-2 number;
means for performing a blending operation on the first predictive samples and the second predictive samples based on the weighting values to determine a prediction block for the block of the video data; and
means for outputting the prediction block.

28. The apparatus of claim 27, wherein the power-of-2 number is equal to $2^n$, wherein n represents an integer value.

29. The apparatus of claim 28, wherein n represents an integer value between −4 and 4.

30. The apparatus of claim 27, wherein the power-of-2 number comprises a tangent of the angle.

31. The apparatus of claim 27, wherein the means for determining the angle for the block of the video data for the geometric partition mode comprises means for determining the angle from a set of available angles, wherein the set of available angles consists only of angles that have tangent values equal to $2^n$, wherein n represents an integer value.

32. The apparatus of claim 27, wherein the means for determining the weighting values based on the power-of-2 number comprises means for applying a shift operation based on the power-of-2.

33. The apparatus of claim 27, wherein the means for determining the weighting values based on the power-of-2 number comprises:
means for applying a shift operation based on the power-of-2 to determine a distance value; and
means for determining the weighting values based on the distance value.

34. The apparatus of claim 33, wherein the means for determining the weighting values based on the distance value comprises means for determining the weighting values from a look-up table.

35. The apparatus of claim 27, wherein the means for performing the blending operation on the first predictive samples and the second predictive samples to determine the prediction block for the block of the video data comprises means for determining a weighted average of a sample of the first predictive samples and a sample of the second predictive samples to determine a sample value for the sample of the prediction block, wherein the weighting values comprise weights for determining the weighted average.

36. The apparatus of claim 27, further comprising:
means for receiving residual data indicative of difference between the prediction block and the block of the video data; and
means for reconstructing the block of the video data by adding the prediction block and the residual data.

37. A computer-readable storage medium storing instructions that when executed by one or more processors cause the one or more processor to:
determine that a block of the video data is encoded in a geometric partition mode;
determine an angle for the block of the video data for the geometric partition mode;
determine a separation line displacement relative to a center of the block for the geometric partition mode;
partition the block into a first partition and a second partition based on the angle and the separation line displacement;
determine first predictive samples for the block of the video data using a motion vector for the first partition;
determine second predictive samples for the block of the video data using a motion vector for the second partition;
determine a power-of-2 number based on the angle for the block of the video data;
determine weighting values based on the power-of-2 number;
perform a blending operation on the first predictive samples and the second predictive samples based on the weighting values to determine a prediction block for the block of the video data; and
output the prediction block.

38. The computer-readable storage medium of claim 37, wherein the power-of-2 number is equal to $2^n$, wherein n represents an integer value.

39. The computer-readable storage medium of claim 38, wherein n represents an integer value between −4 and 4.

40. The computer-readable storage medium of claim 37, wherein the power-of-2 number comprises a tangent of the angle.

41. The computer-readable storage medium of claim 37, wherein to determine the angle for the block of the video data for the geometric partition mode, the one or more processors are further configured to determine the angle from a set of available angles, wherein the set of available angles consists only of angles that have tangent values equal to 2n, wherein n represents an integer value.

42. The computer-readable storage medium of claim 37, wherein to determine the weighting values based on the power-of-2 number, the one or more processors are further configured to apply a shift operation based on the power-of-2.

43. The computer-readable storage medium of claim 37, wherein to determine the weighting values based on the power-of-2 number, the one or more processors are further configured to:
apply a shift operation based on the power-of-2 to determine a distance value; and
determine the weighting values based on the distance value.

44. The computer-readable storage medium of claim 43, wherein to determine the weighting values based on the distance value, the one or more processors are further configured to determine the weighting values from a look-up table.

45. The computer-readable storage medium of claim 37, wherein to perform the blending operation on the first predictive samples and the second predictive samples to determine the prediction block for the block of the video data, the one or more processors are further configured to determine a weighted average of a sample of the first predictive samples and a sample of the second predictive samples to determine a sample value for the sample of the prediction block, wherein the weighting values comprise weights for determining the weighted average.

46. The computer-readable storage medium of claim 37, wherein the one or more processors are further configured to:
  receive residual data indicative of difference between the prediction block and the block of the video data; and
  reconstruct the block of the video data by adding the prediction block and the residual data.

\* \* \* \* \*